United States Patent
Sims et al.

(10) Patent No.: US 11,042,671 B1
(45) Date of Patent: Jun. 22, 2021

(54) METHODS OF USING VECTOR FIELDS AND TEXTURE MAPS AS INPUTS TO DESIGN AND MANUFACTURE COMPOSITE OBJECTS WITH TUNABLE PROPERTIES

(71) Applicant: University of Central Florida Research Foundation, Inc., Orlando, FL (US)

(72) Inventors: Robert Sims, Orlando, FL (US); James Joseph Inziello, Orlando, FL (US); Fluvio Lobo Fenoglietto, Orlando, FL (US); Jack Stubbs, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 16/946,958

(22) Filed: Jul. 13, 2020

(51) Int. Cl.
*G06F 30/12* (2020.01)
*B33Y 50/02* (2015.01)
*G06F 113/10* (2020.01)

(52) U.S. Cl.
CPC ............. *G06F 30/12* (2020.01); *B33Y 50/02* (2014.12); *G06F 2113/10* (2020.01)

(58) Field of Classification Search
CPC ...... G06F 30/12; G06F 2113/10; B33Y 50/02
See application file for complete search history.

(56) References Cited

U.S. PATENT DOCUMENTS

| | | | |
|---|---|---|---|
| 5,209,123 A * | 5/1993 | Prosser | G01N 3/06 73/641 |
| 5,684,713 A | 11/1997 | Asada et al. | |
| 8,449,959 B2 | 5/2013 | Aksay et al. | |
| 8,565,909 B2 | 10/2013 | Bickel et al. | |
| 8,916,651 B2 | 12/2014 | Cheng et al. | |
| 9,022,770 B2 | 5/2015 | Pettis | |
| 9,233,492 B2 | 1/2016 | Zhang et al. | |
| 9,364,995 B2 | 6/2016 | Roberts, IV et al. | |
| 9,623,608 B2 | 4/2017 | Bickel et al. | |
| 10,065,373 B2 * | 9/2018 | Iorio | B29C 64/393 |
| 10,073,440 B1 * | 9/2018 | Fenoglietto | B33Y 50/02 |
| 10,379,525 B1 | 8/2019 | Fenoglietto et al. | |

(Continued)

OTHER PUBLICATIONS

Dapogny, C., et al. "Shape and Topology Optimization Considering Anisotropic Features Induced by Additive Manufacturing Processes" Computer Methods in Applied Mechanics & Engineering, No. 344, pp. 626-665 (2019) (Year: 2018).*

(Continued)

*Primary Examiner* — Jay Hann

(74) *Attorney, Agent, or Firm* — Smith & Hopen, P.A.; Paul Murty

(57) ABSTRACT

Methods of optimizing additive manufacturing processes for improved efficiencies and accuracies, particularly by simplifying the user interface portions of the processes. The methods use path-finding calculations, such as vector fields, vector trails, and texture maps, to form accurate models from which replica composite objects can be printed, without requiring complex parameter inputs and calculations from the user. The methods measure and plot vector fields by considering the location of a particle within the volume of an object at various points of time to develop a strand-like model that is used to manufacture a replica object.

18 Claims, 42 Drawing Sheets

(42 of 42 Drawing Sheet(s) Filed in Color)

(56) References Cited

U.S. PATENT DOCUMENTS

| | | | | |
|---|---|---|---|---|
| 10,395,372 | B2* | 8/2019 | Anand | G06F 30/20 |
| 10,558,199 | B2 | 2/2020 | Fenoglietto et al. | |
| 10,635,088 | B1* | 4/2020 | Bandara | B33Y 50/00 |
| 10,649,440 | B2 | 5/2020 | Fenoglietto et al. | |
| 10,928,805 | B2* | 2/2021 | King | B33Y 50/00 |
| 2008/0170982 | A1 | 7/2008 | Zhang et al. | |
| 2009/0326706 | A1 | 12/2009 | Fink et al. | |
| 2010/0135108 | A1 | 6/2010 | Summons et al. | |
| 2010/0174392 | A1 | 7/2010 | Fink et al. | |
| 2014/0046469 | A1 | 2/2014 | Bickel et al. | |
| 2015/0217518 | A1* | 8/2015 | Chun | A61M 16/06 700/98 |
| 2019/0197210 | A1* | 6/2019 | Bonner | G06F 30/23 |
| 2019/0210288 | A1* | 7/2019 | Elber | G06F 9/3004 |
| 2020/0201287 | A1 | 6/2020 | Fenoglietto et al. | |
| 2020/0207024 | A1* | 7/2020 | Morris | B33Y 50/02 |
| 2020/0356638 | A1* | 11/2020 | Nomura | G06F 30/15 |

OTHER PUBLICATIONS

Coffey et al., Design by Dragging: An Interface for Creative Forward and Inverse Design with Simulation Ensembles. IEEE Transactions on Visualization and Computer Graphics. 2013. vol. 19 (No. 12): 2783-2791.

Geuzaine and Remacle, GMSH: A 3-D finite element mesh generator with built-in pre- and post-processing facilities. International Journal for Numerical Methods in Engineering. 2009. vol. 79: 1309-1331.

Schoberl, Netgen An advancing front 2D/3D-mesh generator based on abstract rules. Computing and Visualization in Science. 1997. vol. 1:41-52.

Si, TetGen, A Delaunay-Based Quality Tetrahedral Mesh Generator. ACM Transactions on Mathematical Software. 2015. vol. 41 (No. 2): Article 11.

Maas et al., FEBio: Finite Elements for Biomechanics. Journal of Biomechanical Engineering. 2012. vol. 134: 011005-1-011005-10.

Bickel et al., Design and Fabrication of Materials with Desired Deformation Behavior. ACM Transactions on Graphics. 2010. vol. 29 (No. 4): Article 63.

Gasser et al., Hyperelastic modelling of arterial layers with distributed collagen fibre orientations. Journal of the Royal Society Interface. 2006. vol. 3: 15-35.

Deuss et al., Assembling Self-Supporting Structures. ACM Transactions on Graphics. 2014. vol. 33 (No. 6): Article 214.

Siemens, Siemens PLM Software: Fibersim: Engineering innovative, durable and lightweight composite structures (brochure). 2014: 1-19. https://www.plm.automation.siemens.com/en/products/fibersim/fibersim-documentation.shtml#lightview-close.

Vanek et al., Clever Support: Efficient Support Structure Generation for Digital Fabrication. Eurographics Symposium on Geometry Processing. 2014. vol. 33 (No. 5): 117-125.

Belter and Dollar, Strengthening of 3D Printed Fused Deposition Manufactured Parts Using the Fill Compositing Technique. PLOS One. 2015. vol. 10 (No. 4): 1-19.

Quan et al., Additive manufacturing of multi-directional preforms for composites: opportunities and challenges. Materials Today. 2015. vol. 18 (No. 9): 503-512.

Massoni et al., Characterization of 3D-printed dielectric substrates with different infill for microwave applications. IEEE MTT-S International Microwave Workshop Series on Advanced Materials and Processes for RF and THz Applications (IMWS-AMP). 2016: 1-4.

Wang et al., Controlling the mechanical behavior of dual-material 3D printed meta-materials for patient-specific tissue-mimicking phantoms. Materials and Design. 2016. vol. 90: 704-712.

Wang et al., Dual-material 3D printed metamaterials with tunable mechanical properties for patient-specific tissue-mimicking phantoms. Additive Manufacturing. 2016. vol. 12: 31-37.

Witzenberg et al., Failure of the Porcine Ascending Aorta: Multi-directional Experiments and a Unifying Microstructural Model. Journal of Biomechanical Engineering. 2017. vol. 139: 031005-1-031005-14.

Witzenberg et al., Mechanical Changes in the Rat Right Ventricle with Decellularization. J Biomech. 2012. vol. 45 (No. 5): 842-849.

* cited by examiner

METHODS OF USING VECTOR FIELDS AND TEXTURE MAPS AS INPUTS TO DESIGN AND MANUFACTURE COMPOSITE OBJECTS WITH TUNABLE PROPERTIES

BACKGROUND OF THE INVENTION

1. Field of the Invention

This invention relates, generally, to additive manufacturing processes. More specifically, it relates to improved and simplified methods of generating accurate models of printed objects, and of manufacturing replica objects based on the models, using path-finding input parameters such as vector fields and texture maps.

2. Brief Description of the Prior Art

Additive manufacturing systems attempt to print a geometrically and physically accurate replica object, particularly when the object is based on a target object (i.e., an input object). While additive manufacturing systems typically succeed in accurately representing an overall geometry of an object, challenges exist in replicating the physical properties of the object. For example, it is difficult to accurately manufacture a replica object having different areas with varying physical properties across the different areas. In such a situation, an additive manufacturing system may individually print each area, and a final replica composite object is formed by combining the individual areas into a single object. However, such a process is time, energy, and resource consuming, resulting in a highly inefficient manufacturing process.

Attempts have been made at forming a replica composite object during a single printing time to overcome the deficiencies within the art. However, such attempts involve complex and complicated systems that require highly technical inputs from a user. While the attempts represent accurate and more efficient manufacturing systems, lay users may not possess the expertise required to engage with the systems. As such, these complex systems have a high barrier to entry and a steep learning curve for newer, inexperienced users.

Accordingly, what is needed is a simplified and efficient additive manufacturing system that does not rely on complicated input parameters and calculations, such that lay users can engage with the system. Moreover, attempts have been made to accurately represent target objects in printed replica objects. However, growing and propagating geometries within a volume has proven to be difficult within the art. Accordingly, methods of path-finding and propagating geometries and shapes within a volume to more accurately represent a structure is also needed. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a simplified, efficient, and highly-accurate additive manufacturing method is now met by a new, useful, and nonobvious invention.

The novel method includes a step of receiving an input of a shape and volume of a target object. The shape of the target object may be linear, curved, or irregular. One or more physical properties of the target object are calculated. The physical properties exhibit anisotropic behavior. A three-dimensional representation of the target object is generated based on the shape, the volume, and the calculated physical properties. Specifically, a domain of the target object is defined in the three-dimensional representation. The domain is configured to describe the calculated one or more physical properties exhibiting anisotropic behavior of the target object. The domain is defined by a set of values selected from the group consisting of point clouds, curves, splines, paths, vector fields, texture maps, color maps, and voxels, thereby describing anisotropic behavior of the target object. One or more bodies are selected to propagate about the domain using the set of values. An initial set of parameters, such as angles, lengths, widths, densities, frequencies, and combinations thereof, are selected for each of the one or more bodies. The set of parameters further optimize the set of anisotropic values of the one or more bodies. The one or more bodies are propagated throughout three-dimensional representation of the target object, following the domain.

The generated three-dimensional representation is compared with the shape, the volume, and the calculated physical properties of the target object. Based on a determination that the three-dimensional representation differs from the shape and the volume of the target object by more than a tolerance value, the three-dimensional representation is optimized by modifying one or more of the propagated bodies. Based on a determination that the generated three-dimensional representation differs from the shape and the volume of the target object by less than a tolerance value, an additive manufacturing system is instructed to generate a physical object based on the three-dimensional representation.

An embodiment of the method includes a step of orienting a growth direction of each of the one or more bodies to match a directionality of the target object. Normal vectors are used to maintain a constant growth direction for each of the propagated one or more bodies. Vector fields are used to vary the growth direction for at least one of the one or more bodies.

The method may include a step of selecting a second set of simulation parameters after the step of selecting the initial, or first, set of parameters. The second set of simulation parameters includes one or more values selected from the group consisting of a separation distance between subsequent discrete points, a discrete point offset value, a seed number to alter an offset between discrete points, and a relax iteration value to set a maximum number of simulations. The second set of simulation parameters is configured to be updated throughout the step of propagating the one or more bodies.

An embodiment of the method includes a step of selecting a post-processing set of parameters after the step of propagating one or more bodies about the starter path is completed. The post-processing set of parameters may include a rotation degree of the one or more bodies, a width of each strand, or an inversion of the three-dimensional representation.

In an embodiment, the method includes a step of generating a bounding box volume about the defined shape and volume in the three-dimensional representation, such that the one or more bodies are propagated only within the bounding box volume.

The method may include a step of analyzing a plurality of particles across the volume of the target object at each discrete point of the volume. A vector is stored for each of the plurality of particles within the propagated one or more bodies to generate a plurality of vector trails across a plurality of iterations. Each of the plurality of vector trails represent translations of each of plurality of particles across the plurality of iterations. A translation of a particle from a first of the one or more bodies to a second of the one or more bodies results in a termination of a first vector within the first of the one or more bodies and a generation of a second vector within the second of the one or more bodies. A rotational vector may be calculated at each discrete point of the volume, and a weight may be applied to the rotational vector to adjust an orientation of the plurality of vector trails. In an embodiment, the vector trails are grown in the x-direction, y-direction, and/or z-direction to form elongated, fiber-like structures within the volume.

In an embodiment, the target object is a respiratory mask including a filter designed to prevent the transmission of airborne pathogens. The respiratory mask includes a proximal side configured to be a user-facing side of the respiratory mask. The proximal side includes a perimeter defined by the domain configured to describe the calculated one or more physical properties exhibiting anisotropic behavior of the target object. As such, the proximal side of the respiratory mask is configured to conform to a face of a wearer to form a continuous seal while allowing facial movements, breathing, and speaking by the wearer.

An object of the invention is to improve the functionality and access of additive manufacturing processes for inexperienced users, while simultaneously improving the efficiency and quality of the objects created via additive manufacturing.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawings will be provided by the Office upon request and payment of the necessary fee.

For a fuller understanding of the invention, reference should be made to the following detailed description, taken in connection with the accompanying drawings, in which.

DETAILED DESCRIPTION OF THE INVENTION

Figure 1B:
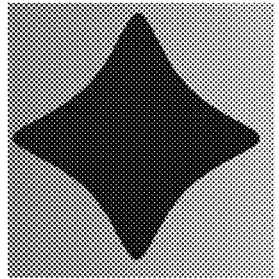
FIG. 1B depicts a cross-section input curve.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes methods of optimizing additive manufacturing processes for improved efficiencies and accuracies, particularly by simplifying the user interface portions of the processes. The present invention is aimed toward individuals in need of developing objects with specific physical properties (such as anisotropic elasticity, permeability, conductivity, etc.), building upon and increasing accessibility of prior art methods for the design and manufacture of composites with tunable physical properties. Specifically, the present invention includes the generation of shapes, bodies, and/or structures, by means of defining a domain of a target object in a three-dimensional representation. The domain describes physical properties exhibiting anisotropic behavior of the target object, and the domain is defined by a set of values selected from the group consisting of point clouds, curves, splines, paths, vector fields, texture maps, color maps, and voxels, thereby describing anisotropic behavior of the target object. The steps involved in defining the domain may alternatively be described as a path-finding algorithm. Provided with information about the nature of the target object's properties (such as magnitude, directionality, etc.), the methods of the present invention construct and propagate bodies or structures, internally and/or externally to the target geometry, that allow the fabricated replicate object to approximate the physical behavior of the target object.

For example, to achieve planar anisotropy on thin plates, laminates, sheets, and films, the method includes steps directed to the generation of paths that guide the construction of bodies or structures. These bodies or structures have intrinsic physical properties, while the paths ensure that the physical properties match the directionality of the target object. The method uses normal vectors and/or vector fields to orient the growth said bodies or structures. Normal vectors may be used to maintain the direction constant through the replica object, while fields may be used to vary the direction of growth along the object's volume. These steps will be described in greater detail throughout this specification, and the examples below describe methods of growing geometries and manufacturing accurate structures.

Example 1—Growth of Structures within Planar Volumes

In a first example, a target object's domain is used to distribute and propagate structures, like fibers. To guide the construction of bodies or structures, the method requires at least two input values. The first required input value is the object forming the main shape of the overall structure to be manufactured. The second required input is a body or a sample of the body or structure to be propagated.

Figure 1A:
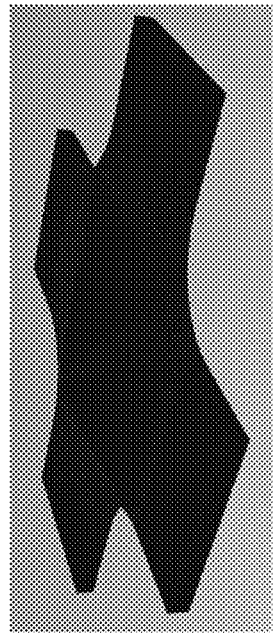
FIG. 1A depicts an input geometry model.

An example of the first value is depicted in FIG. 1A, which includes a representation of a shape within which fibers (such as fibers designed to represent natural collagen fibers). The overall shape value input is a closed polygon object that is used to initialize the source points for the remaining steps of the algorithm, as well as to clip the resulting fibers to ensuring they do not exceed the bounds of the input. FIG. 1B depicts an example of the cross-section of fibers input value, which is a non-uniform rational B-spline (NURBS) curve object. The curve is aligned along the x-y axis for proper scaling and for proper sweeping of the cross section along the fibers.

A third input can be used as well, such as a vector field that controls the growth of the fibers within the field. The last input is a volume that contains vectors that control the growth direction of the fibers at each discrete point in the source geometry. Such an input is optional, and if ignored, the simulation uses the initial fiber orientation as the growth direction at each point of the simulation. For best results, the volume should at least contain the geometry that provides the first input, but the simulation will use the nearest value to determine growth direction, if necessary.

The input values are combined with tunable parameters are used to shape the growth of the field of fibers created via the method. The parameters include initialization parameters, simulation parameters, and post-processing parameters. Initialization parameters can only be edited before the start of the simulation. Any changes made after the start of the simulation will not take effect and the simulation will have to be recalculated in order to see the results. The simulation parameters are referenced during the runtime of the simulation and can be edited to create changes dynamically as the simulation runs. These parameters can be animated, and will update as each subsequent frame is simulated. Post-processing parameters can be changed at any time, but the results are calculated at the end of the simulation, and will not update dynamically. These changed will occur across all time when they are updated.

Initialization parameters include, for example, collagen angles, strand amounts, maximum strand lengths, length jitters, and a percentage of stray fibers. The collagen angle parameter determines the initial position and growth direction of the collagen fibers. If there is no third input, this value is propagated throughout the entire field of collagen. The strand amount parameter controls the number of strands to be propagated through the field of collagen. The maximum strand length is a soft upper limit parameter on the length of an individual extent of collagen fibers. The length jitter parameter creates a random length variation in each individual starch of collagen. For example, if Max Length is set to 0.7 and Length Jitter is 0.2, the length range for each stretch of collagen is between 0.5 and 0.9. The percentage of stray fibers parameter controls how many fibers do not follow the main fiber alignment at the start. These fibers have randomly determined orientations.

Simulation parameters include, for example, link sizes, location jitter scales, seed numbers, and relax iterations. The link size parameter is a distance in between each point on a collagen strand. The location jitter scale parameter describes the amount of offset along the plane perpendicular to the movement vector a point can have at each step. The seed parameter is a number that dynamically changes the offset of the points. The relax iteration parameter describes the number of times the solver attempts to ensure that there are no points within a height or a width of another point.

Post-processing parameters include, for example, twist amounts, backbone non-uniform scales, backbone uniform scales, collagen colors, and reverse normal. The twist amount parameter describes the degrees of rotation that the backbone of the collagen structure undergoes between the beginning and end of a fiber strand. The backbone non-uniform scale parameter is the amount of scaling in the x- and y-components of the base backbone shape. The backbone uniform scale parameter is the overall width of each individual fiber. The collagen color parameter describes a color of a strand of fiber in the structure. The reverse normal parameter inverts the shape of the structure to attempt to resolve a failed simulation.

Figure 1C:
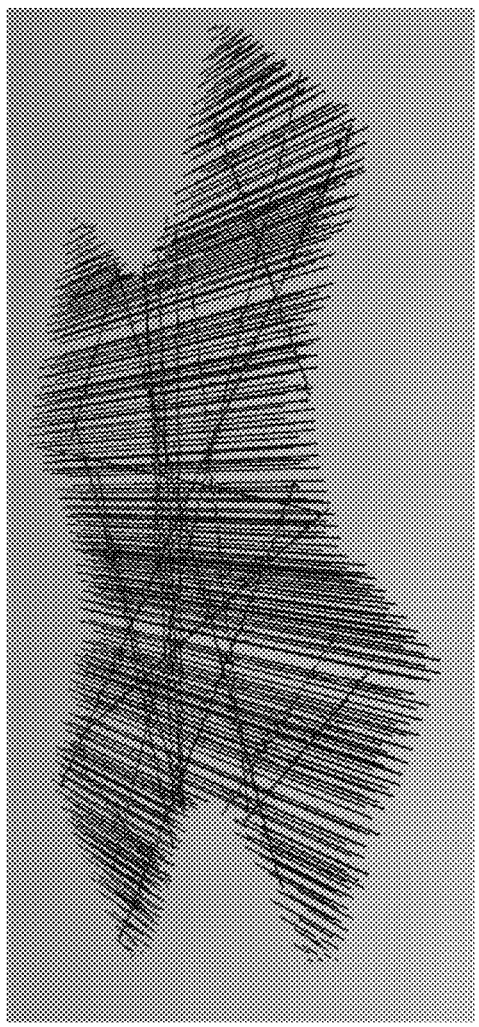
FIG. 1C depicts an output field of fibers based on the inputs of FIGS. 1A-1B.
Figure 1D:
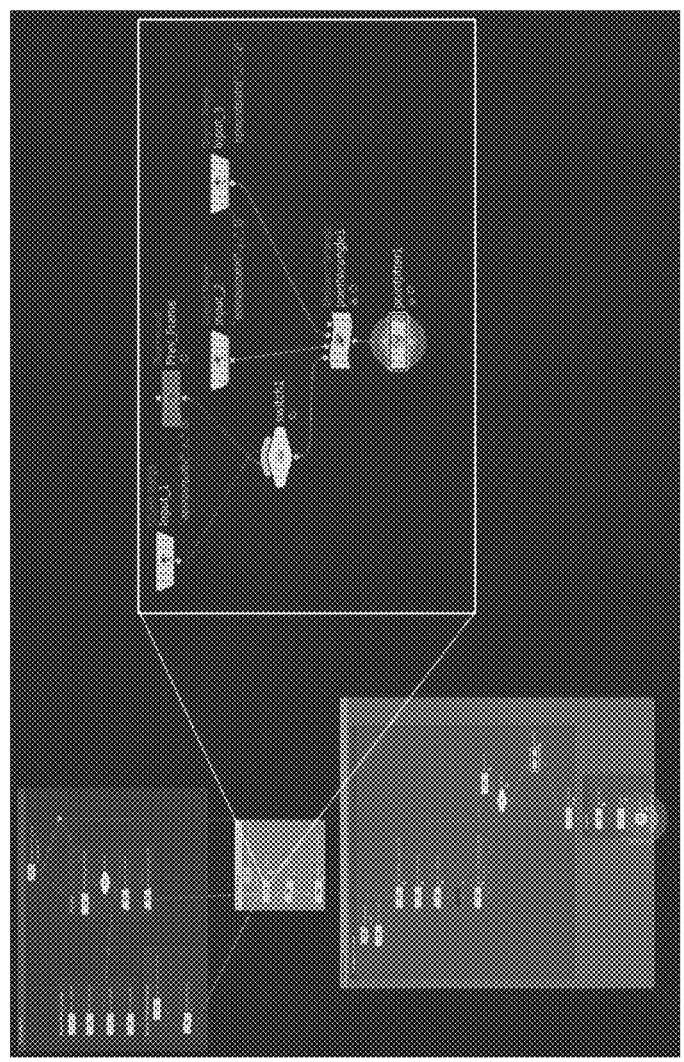
FIG. 1D is an overview of the initialization, simulation, and post-processing steps of a method.

FIG. 1C depicts the output of a simulation based on the above parameters and the input values depicted in FIGS. 1A-1B. The simulation outputs a field of fibers that meet the parameters described above, creates a field of fibers that have a strong visual correlation to collagen fibers, and can be tuned to match shape, directionality, and size of collagen fibers.

The process of solving the inputs includes three steps, which correspond to the initialization parameters, simulation parameters, and post-processing parameters. Initialization nodes are only executed at the start of the simulation, and as such do not have any bearing on the calculation of the results after the first frame. Simulation nodes create incremental changes based off of the base state. Post-processing nodes are executed after the solve step, have the same effect on the system every time, and are not subject to incremental changes. Post-processing nodes do, however, change on each frame as a result of the incremental changes in the previous simulation step, but the post-processing effect will not change values incrementally like they can in the simulation step. An embodiment of the node setup is shown in FIG. D, including color coding according to which step in the process the nodes belong, with red representing the initialization step, yellow representing the simulation step, and green representing the post-processing step.

Figure 1E:
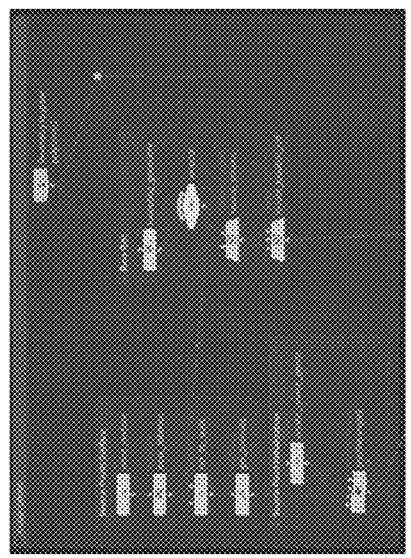
FIG. 1E is a detailed view of the initialization steps of the method of FIG. 1D.

The initialization step is shown in more detail in FIG. 1E. The initialization step for the simulation takes the geometry input and creates two outputs, elements that are fed into the solving step. One element is a bounding box volume that serves as an "out of bounds" for where new strands of collagen are and are not allowed to be placed. The other element is a set of points that are used as the source of the fiber strands that are propagated through the geometry of the first input. The geometry data is also passed along to the post-processing step.

Figure 1H:
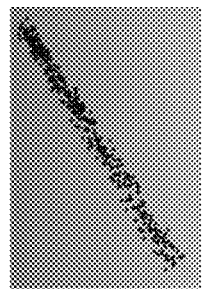
FIG. 1H depicts a distribution of points based on the parameters depicted in FIGS. 1F-1G.
Figure 1G:
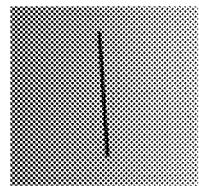
FIG. 1G depicts a plane for the growth of fibers that is trimmed to fit a bounding box.
Figure 1F:
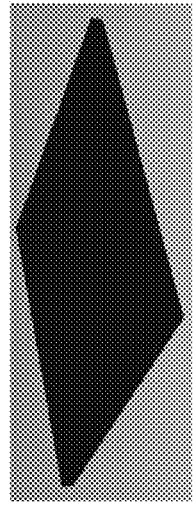
FIG. 1F depicts an out of bounds volume of the geometry.

The out-of-bounds volume is shown in FIG. 1F, in which the geometry is passed into a bounding box node that creates a box that wholly contains the geometry, which is then passed into a VDB from a polygon node, and converted into a VDB volume. This process creates a signed distance field of the bounding box, which is basically a 3-dimensional array of floats that store the distance to the surface of the object, where positive numbers are outside of the volume, and negative numbers are inside of the volume. These values can be accessed from any discrete point in space, and therefore can be used to instruct the simulation that it has reached the extents of the shape, and no longer needs to extend the collagen.

The process to create the source points includes a step of creating a plane along the XY plane (for reference, the fibers are grown along the XZ plane). This plane is then rotated a number of degrees specified by the collagen angle parameter, and trimmed to fit the bounding box, as shown in FIG. 1G. The surface normal of this plane is then calculated, as it will be used to determine the initial growth direction, as well as the overall growth direction if no third input is provided. After this, a number of points equal to the strand amount parameter are scattered onto that planes surface. These points are then pushed along their growth axis randomly to prevent a seam being disposed in the stretch of collagen. Each point is also assigned to a polyline body that will represent the strand the point is a part of, a current length, and a direction vector that is equal to the normal vector calculated earlier in the process. Additionally, an amount of points determined by the percentage of stray fibers parameter are given a random rotation and matching direction. Finally, the polyline body to which the point is attached is given a length vector as determined by the max length and length jitter parameters. An example of the final points is demonstrated in FIG. 1H.

Figure 1J:
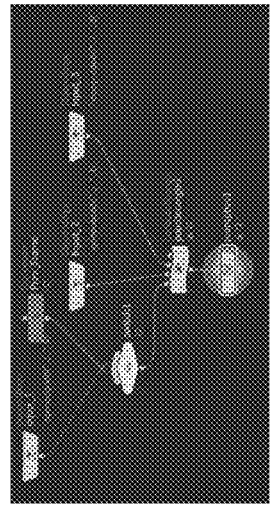
FIG. 1J is a detailed view of the nodes that entail the subnetwork of the simulation steps of FIG. 1I.
Figure 1I:
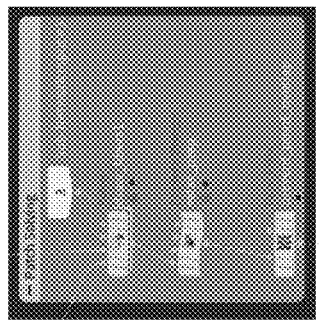
FIG. 1I is a detailed view of the simulation steps of the method of FIG. 1D.

During the simulation step of the process, shown in FIGS. 1I-1J, part of the simulation calculates whether or not the collagen fibers will expand and whether or not there will be a new fiber created if the fiber is no longer expanding. The simulation step also ensures that there are not collisions between points. During the step, the last point in each collagen fiber first determines its new direction vector. This is determined by either a vector value in the third input at the point's current location, or the previously used vector direction, which is initialized to the normal direction of the point source plane.

After determining the direction, the program determines where a new point would be placed, using the link size parameter as the distance along the calculated direction vector. This point is then compared to the SDF (signed distance field) volume created in the initialization step to see if the point is in bounds. If the point is not in bounds, the calculation for that point ends without creating a new point and moves to the next point. If the point is in a valid location, however, the simulation checks to see if the new length of the fiber strand would be longer than the strand's max value. During the check, the simulation assumes the new point would be connected to the new length of fiber strand. If the value would be longer than the max value, then the simulation ends the current fiber, and creates a new point and new line that will begin to be solved. If the length would be shorter, then the new point is added to the current fiber being calculated.

Finally, after all of these calculations, the simulation moves on to either the next point, or to the next frame if all of the points have been calculated. Once the new nodes have been created, the final step in the simulation step is to add a random location jitter to each new point. The magnitude of the jittering is determined by the location jitter scale parameter. The simulation also performs a relax operation to ensure that none of the fibers intersect after the random location jittering.

Figure 1K:
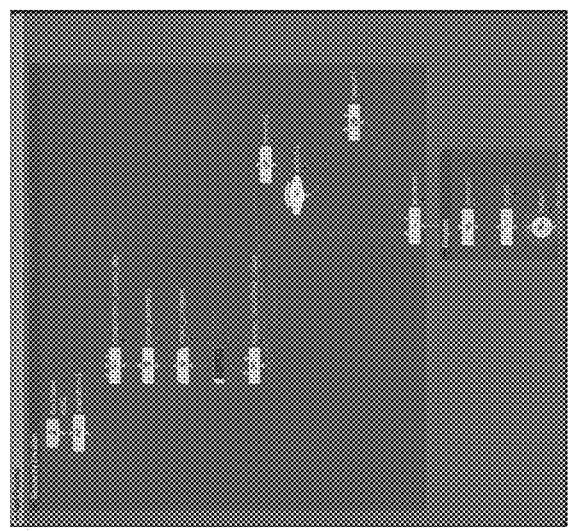
FIG. 1K is a detailed view of the post-processing steps of the method of FIG. 1D.
Figure 1L:
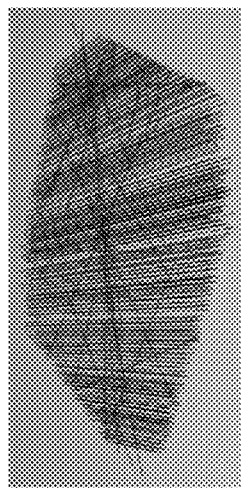
FIG. 1L is a pre-clipped distribution of fibers grown according to the method of FIG. 1D, prior to clipping to the mesh of the geometry as depicted in FIG. 1C.

As shown in FIG. 1K, the post-processing step governs the operations that take place after simulation step has run. These operations are calculated the same way at every frame, and do not change incrementally like the changes in the simulation step. The first step in post-processing is to analyze the cross-section shape that will be used to make the strand cross-section. The non-uniform and uniform scale parameters adjust the backbone to be the correct proportion and correct size, respectively. After the backbone shape is finalized, the backbone is swept along each fiber to create a closed tube shape. The twist amount parameter also applies a rotation along the length of each fiber. Finally, the created models are re-meshed to ensure the best possible geometry before being input into the Boolean operation. The result of these first few steps is a square of collagen, such as that shown in FIG. 1L. This field is finally clipped by the original mesh geometry, creating a field of fibers that fits within the shape provided as an initial input, as shown in FIG. 1C. Finally, color provided by the collagen color parameter is applied to the final mesh.

Example 2—Vector Fields Used to Grow Fibers

Figure 2B:
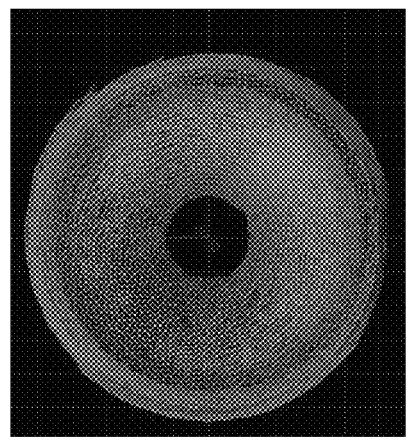
FIG. 2B depicts the growth of a three-dimensional structure in a circumferential fashion resulting from the orientation of the vectors in FIG. 2A.
Figure 2A:
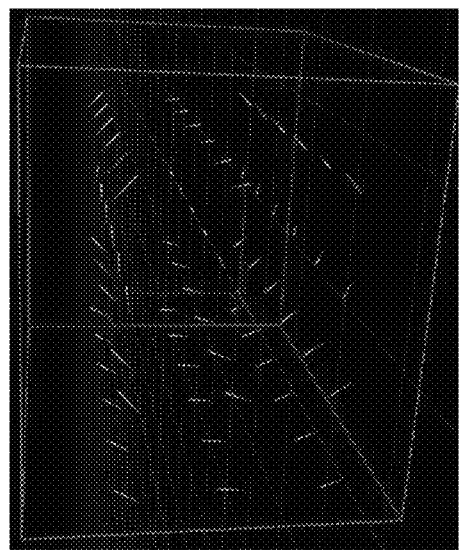
FIG. 2A is a depiction showing a sub-set of vectors for an object, in accordance with an embodiment of the current invention.
Figure 3B:
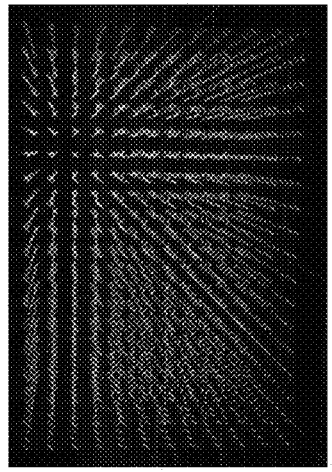
FIG. 3B is a vector field showing the vector trails of FIG. 3A.
Figure 3A:
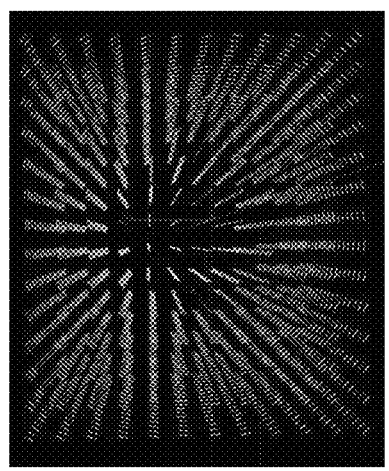
FIG. 3A is a representation of vector trails generated by identifying a location of a particle at each point within an object's volume.
Figure 3D:
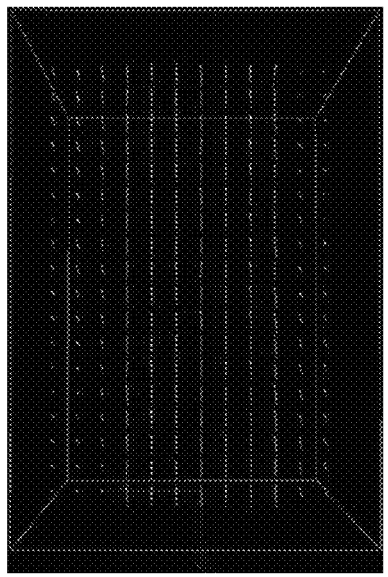
FIG. 3D is a vector field expanding upon the vector trails of FIG. 3A showing x- and y-vector components.
Figure 3F:
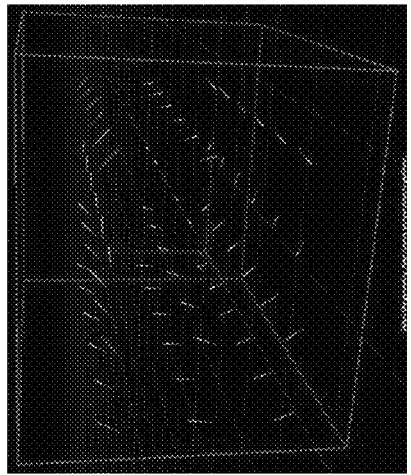
FIG. 3F is a vector field expanding upon the vector trails of FIG. 3A showing x-, y-, and z-vector components arranged in a circumferential pattern, similar to the depiction of FIG. 2A.
Figure 3C:
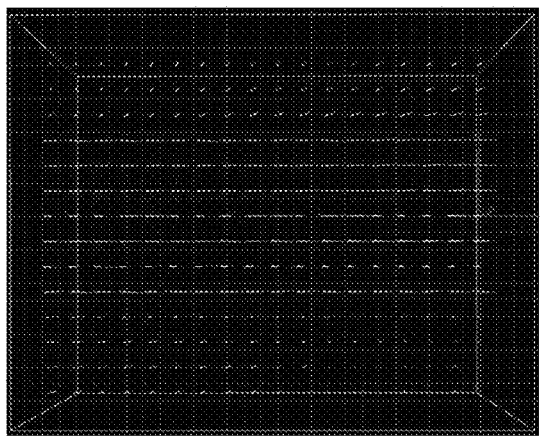
FIG. 3C is a vector field expanding upon the vector trails of FIG. 3A showing x- and y-vector components.
Figure 3E:
FIG. 3E is a vector field expanding upon the vector trails of FIG. 3A showing x-, y-, and z-vector components.

In a second example, vector fields are used as values to define the domain to distribute and propagate fiber structures. FIG. 2A shows an example of a path-finding algorithm in the form of a volumetric vector field generated for a volume of a particular object, showing a subset of the vectors within the field traveling in a circumferential orientation. The vectors are shown as generated via vector trails, which will be described in greater detail below. As shown in FIG. 2B, the vector trails and the generated vector field can be used to generate a model of a structure in a circumferential orientation, such that a cylindrical replica composite object can be additive manufactured from the model. These principles will be discussed in greater detail throughout this specification.

Vector fields are particularly important when characterizing complex, heterogeneous materials, such as biological tissues. For example, biomechanics and tissue mechanics experts perform biaxial mechanical tests to understand the inherent anisotropic behavior of cardiac tissue [1]. In the most common examples of mechanical tests, multidimensional or multiaxial deformation data is measured in strain fields, which is then represented in images with embedded vector information per pixel. Within the context of tissue mechanics, strain fields allow researchers to estimate the presence, concentration, and direction of structural proteins, such as collagen. In some instances, these estimates are used to create micro-structure-inspired models or representations for finite element analysis (FEA) simulation [2]. The methods described herein use strain fields to generate microstructures for fabrication of replica composite objects. The resulting composites are then used for high-fidelity physical simulation, testing, and validation.

Turning now to FIGS. 3A-3F, an example of the generation of vector fields is shown in detail. The vector trails shown in the figures are used in growing fiber-like strands in a three-dimensional model for the replication of the studied object from which the vector trails are formulated. To form the vector trails and the vector field, a vector is stored at each point within the volume of the object. Each stored vector contains the direction a particle at the location of the vector will be translated during each iteration of the analysis. By storing the location of the plurality of particles at each discrete moment across many iterations, a resulting vector trail is formed from the translation of the particle. Each vector trail can be traced to create a strand-like structure that has a strong visual resemblance to collagen fibers, when viewed together.

The vector fields of the instant methods illustrate that, at each discrete point inside the volume of a model or an object, a direction is stored showing short translation lines, as indicated by the short vector lines shown in FIGS. 3A-3F. In terms of the three-dimensional model, the particle translation is measured across multiple voxels, and each vector line is measured until the particle travels into a new voxel. Upon entering the new voxel, a new vector line is formed, until elongated, fibrous strands are extruded until the entire volume is comprised of the vector trails. Applied to the example discussed above relating to collagen and cardiac tissue, by using the methods disclosed herein, growth vectors are obtained at each discrete point within the tissue until a collagen-like replica strands are created for the entire tissue volume. Accordingly, as FIGS. 3A-3F show, the vector fields can be used to grow an overall shape an orientation of the model in the x-, y-, and z-axes, resulting in a three-dimensional model that is used to manufacture a replica composite object. By using vector field data that is collected on an object in each direction, the resulting vector field can be directly input into a three-dimensional modeling software and used to create physically-accurate sections of the object with minimal user input.

Figure 4B:
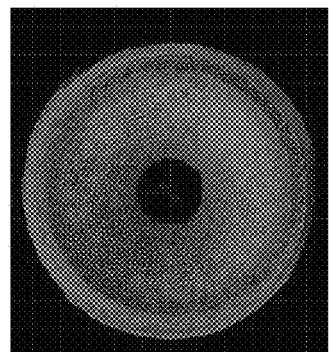
FIG. 4B is a view along the z-axis of the model of FIG. 4A, depicting the circumferential orientation of fibers about the z-axis, similar to the depiction of FIG. 2B.
Figure 4A:
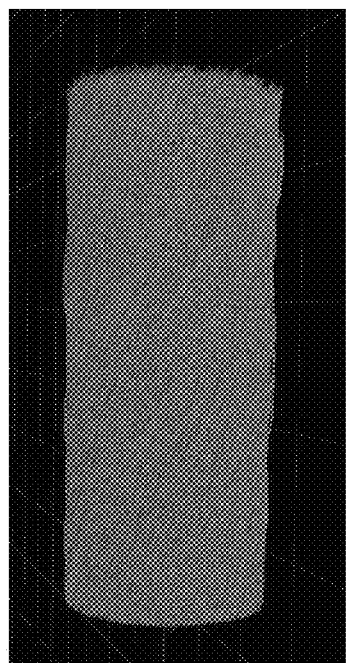
FIG. 4A is a three-dimensional model depicting fibers grown via vector trails along the length of the z-axis of the model, in accordance with an embodiment of the current invention.
Figure 5D:
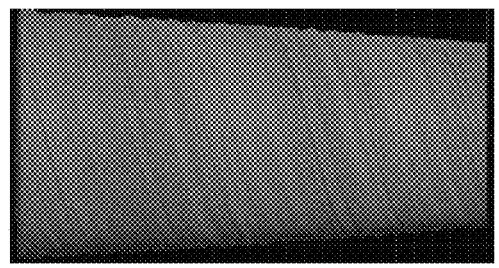
FIG. 5D depicts the three-dimensional model of FIG. 5A with a rotational direction vector weight value of four, in accordance with an embodiment of the current invention.
Figure 5C:
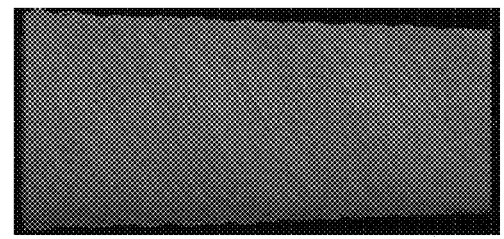
FIG. 5C depicts the three-dimensional model of FIG. 5A with a rotational direction vector weight value of two, in accordance with an embodiment of the current invention.
Figure 5B:
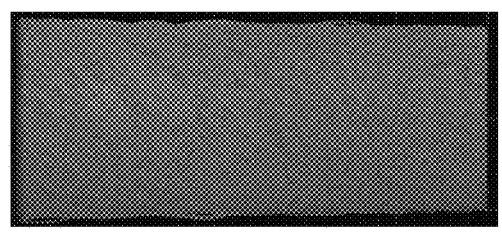
FIG. 5B depicts the three-dimensional model of FIG. 5A with a rotational direction vector weight value of one, in accordance with an embodiment of the current invention.
Figure 5A:
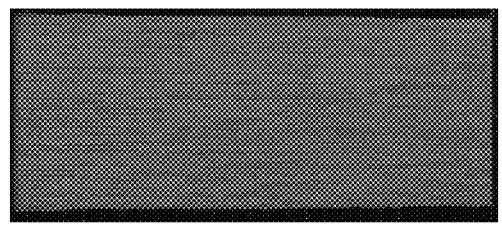
FIG. 5A is a three-dimensional model depicting fibers grown via vector trails along the length of the z-axis of the model, showing the vector trails with a zero-weight value applied to the rotational direction vector used to populate the volume of the model.

FIGS. 4A-4B depict examples of the resulting three-dimensional model formed by the vector field analysis as described above. In particular, the figures show elongated fibers grown along the length of the z-axis of the model to form a cylindrical model. The input vector trails to generate the model were measured with respect to the z-axis, and the cross-product of the vectors was calculated to determine the orientation of the vectors with respect to the curve, as well as vectors of travel. The result of the calculation was the value of the rotational vector at any point within the model's volume, from which further calculations can be derived. In addition, as shown in FIGS. 5A-5D, different weight values can be applied to the rotational vector that is used to propagate the volume, thereby adjusting the orientation angle of the model's fibers. For example, the volume shown in FIG. 5A has a zero weight value applied to the rotational vector; the volume shown in FIG. 5B has a weight value of one applied to the rotational vector, showing tighter interwoven strands. FIG. 5C has a weight value of two applied to the rotational vector, showing increasingly interwoven strands; and FIG. 5D has a weight value of four applied to the rotational vector, with an even tighter interwoven nature of the strands.

Figure 6B:
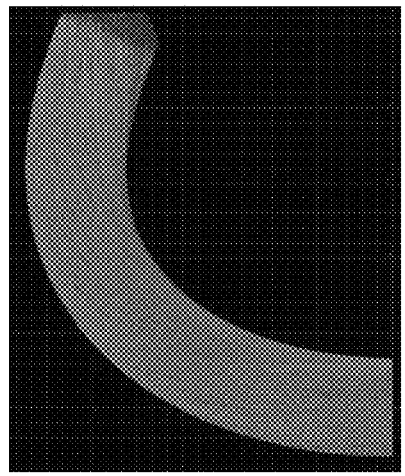
FIG. 6B is an example of a model grown along the spline of FIG. 6A.
Figure 6D:
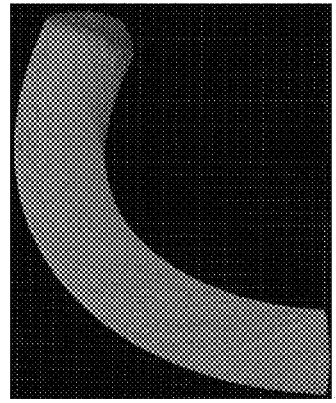
FIG. 6D depicts the three-dimensional model of FIG. 6C with a rotational direction vector weight value of one, in accordance with an embodiment of the current invention.
Figure 6A:
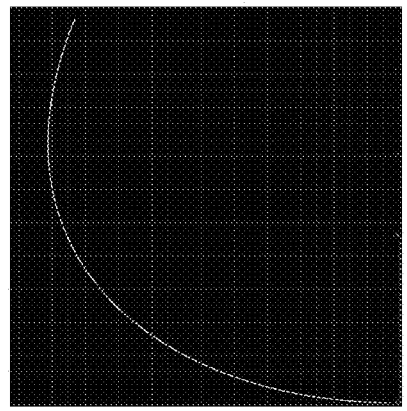
FIG. 6A is a pre-drawn path representing a spline for the growth of fibers via vector trails, in accordance with an embodiment of the current invention.
Figure 6C:
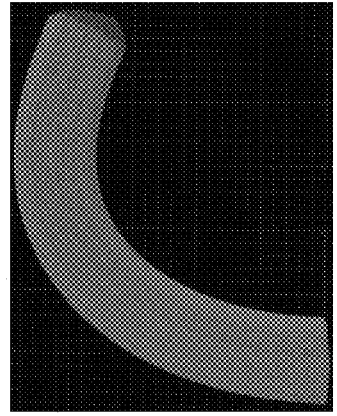
FIG. 6C depicts a three-dimensional model with vector trails grown along the spline of FIG. 6A, showing the vector trails with a zero-weight value applied to the rotational direction vector used to populate the volume of the model.
Figure 6F:
FIG. 6F depicts the three-dimensional model of FIG. 6C with a rotational direction vector weight value of four, in accordance with an embodiment of the current invention.
Figure 6E:
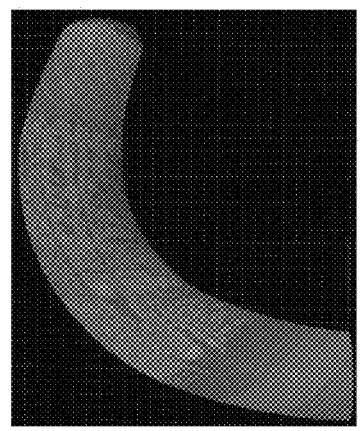
FIG. 6E depicts the three-dimensional model of FIG. 6C with a rotational direction vector weight value of two, in accordance with an embodiment of the current invention.

Applying the concepts above, FIGS. 6A-6F depict the growth of fibrous strands via vector fields about a curved spline. As shown in FIG. 6A, a pre-drawn path is provided as an input parameter, such that vector fields are generated with respect to the path. FIG. 6B shows a set of strands generated about the path, such that the strands are braided around the curved axis of the path. FIGS. 6C-6F, similar to FIGS. 5A-5D, show varying weight values applied to the rotational vectors of the models, with a zero weight value applied in FIG. 6C, a weight value of one applied in FIG. 6D, a weight value of two applied in FIG. 6E, and a weight value of four applied in FIG. 6F. Similar to the example depicted in FIGS. 5A-5D, increasing the weight value applied to the rotational vector results in a tighter interwoven nature of the strands formed from the vector fields. For each example, once the vector fields are generated and the desired weight value for the rotational vector is selected, an additive manufacturing machine can generate a replica composite object oriented with the overall structure of the model, and with interwoven strands of filament replicating the strands in the model.

Figure 7B:
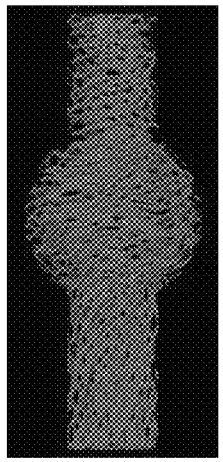
FIG. 7B depicts the fibers grown to match the source shape of FIG. 7A.
Figure 7A:
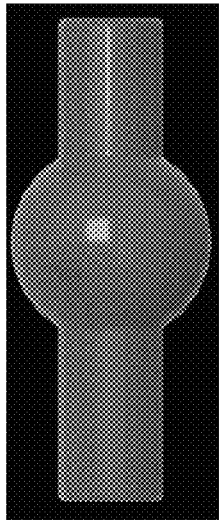
FIG. 7A depicts an irregular source shape used as an input to grow fibers in an irregular distribution.

The same concepts can be used to more complex structures by using space colonization to create shapes with non-uniform thicknesses. While linear and curved shapes with uniform thicknesses include source points having a mostly uniform diameter throughout the motion, non-uniform diameters present complicated issues for property accuracy. However, as shown in the examples of FIGS. 7A-7B, a source shape (FIG. 7A) can be used to generate a space colonization system that is groomed using the z-axis as the direction vector, creating the shape in FIG. 7B. In this technique, the space colonization algorithm accounts for changes in the width of the tubes, and forces the fibers to expand and contract along with the changes, while still using the direction and spin vectors to drive the primary growth direction of the particles.

Figure 8:
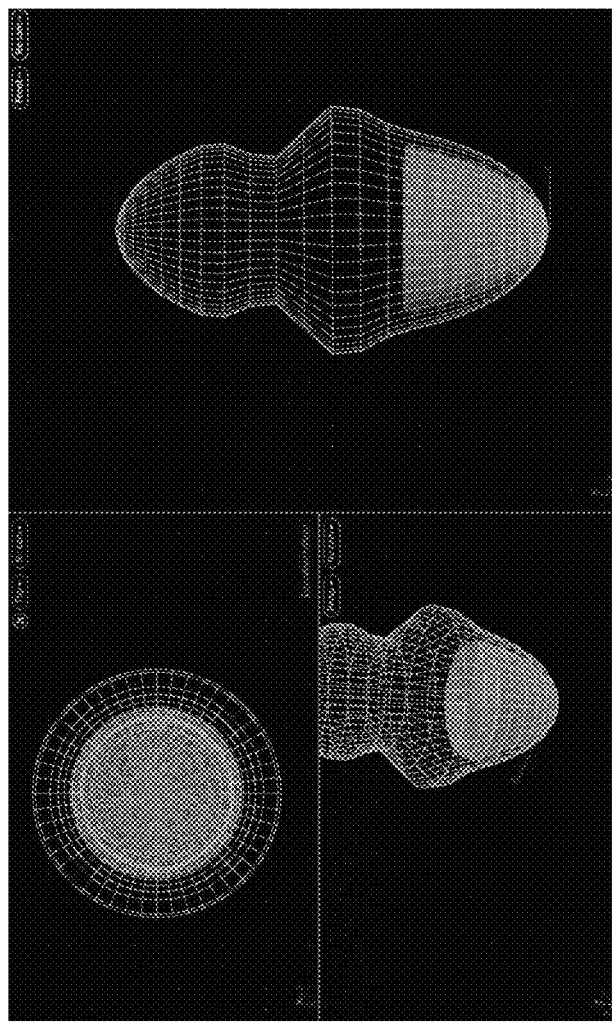
FIG. 8 depicts top-down, perspective, and orthogonal views of a three-dimensional model showing the filling of an irregularly-shaped internal cavity with a removable support structure post-printing, in accordance with an embodiment of the current invention.

FIG. 8 depicts another embodiment of the instant method that can be implemented not only in linear or curved model shapes, but also in irregularly-shaped designs to optimize the production of objects based on irregular models. Previous works have described the optimizations of selected base materials to form composite objects with tunable physical properties; the calculation and printing of deformed and reconfigurable objects to reduce printing volumes and support structures; and the optimized selection, printing, and removal of support structures within a three-dimensional object. As FIG. 8 shows, the previously described methods can be implemented to fill an irregularly-shaped cavity with a removable support structure, with the model shown in FIG. 8 generatable via the vector fields and vector trails discussed in detail above.

Accordingly, the methods can be used in combination with the previously-described methods to improve thereupon. Specifically, a method of modeling, optimizing, and manufacturing a three-dimensional object can include the steps of selecting composite elements and structures from a material inventory or database; optimizing and fine tuning the desired mechanical, physical, optical, electrical, chemical, and other properties of both the overall three-dimensional object and each of the selected composite elements and structures; and manufacturing complex composites structures with varying, irregular structures and geometries, as well as non-uniform underlying materials, contributing to variations in the object's properties. Moreover, manufactured structures can include deformation, motion, translation, and actuation effects as desired and needed to improve manufacturing efficiencies and accuracies. The structure of the object, as well as the orientation of printed materials (such as fibrous strands of materials) can be captured and modeled via the vector fields and trails described above to greatly simplify the manufacturing system, particularly for use by lay persons. In addition to the above, the method can include the design and assembly of actuated components that are capable of producing motion, with the design and actuation of the components being manipulatable and controllable. These actuated components can be manufactured alone or in combination with non-actuated components of a particular object. The manufacture of actuated and manipulatable components extends the advantages of the instant methods to the design and production of moving and functional designs to manipulate or control the change of a state of the components, causing an action to take place.

Figure 9B:
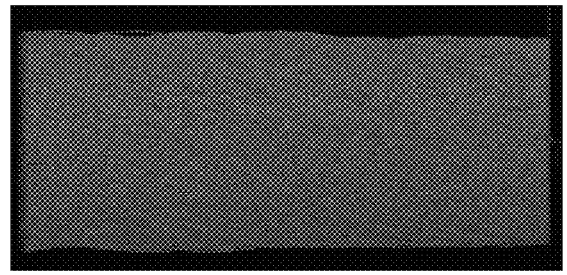
FIG. 9B is an orthogonal view of the three-dimensional model of FIG. 9A.
Figure 9A:
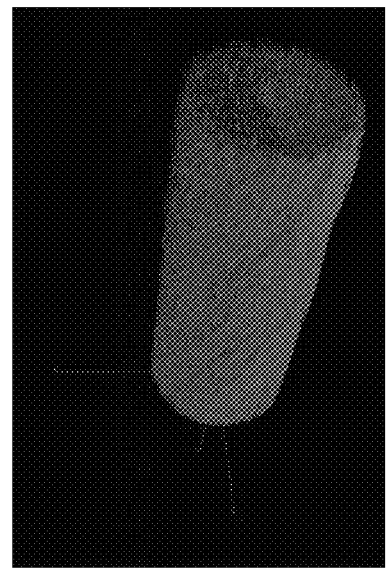
FIG. 9A is a three-dimensional model depicting an annular tube that is optimized with support structures and printing parameters to experience uniform deformation (i.e., compression and expansion) about the diameter of the tube, in accordance with an embodiment of the current invention.
Figure 10:
FIG. 10 is a three-dimensional model depicting an annular tube that is bent in one axis with a defined radius of curvature, in accordance with an embodiment of the current invention.
Figure 11A:
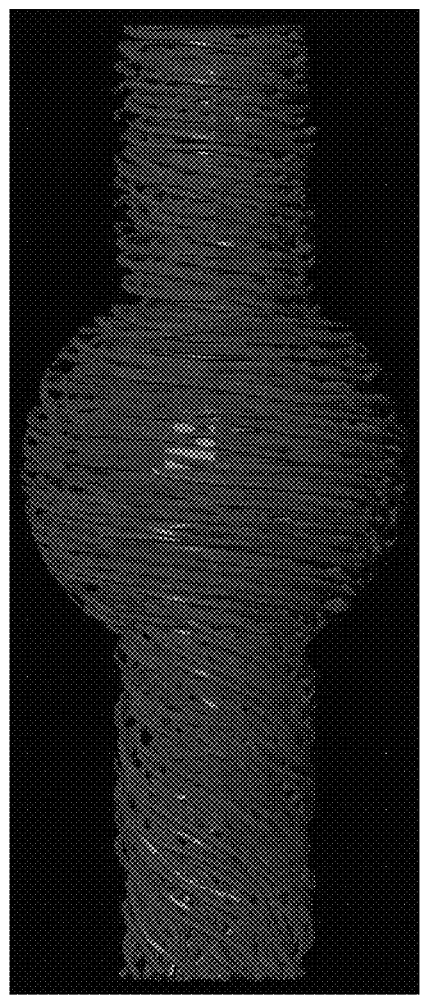
FIG. 11A is a three-dimensional model of an annular tube having controlled expansion in one area of the model, in accordance with an embodiment of the current invention.
Figure 11B:
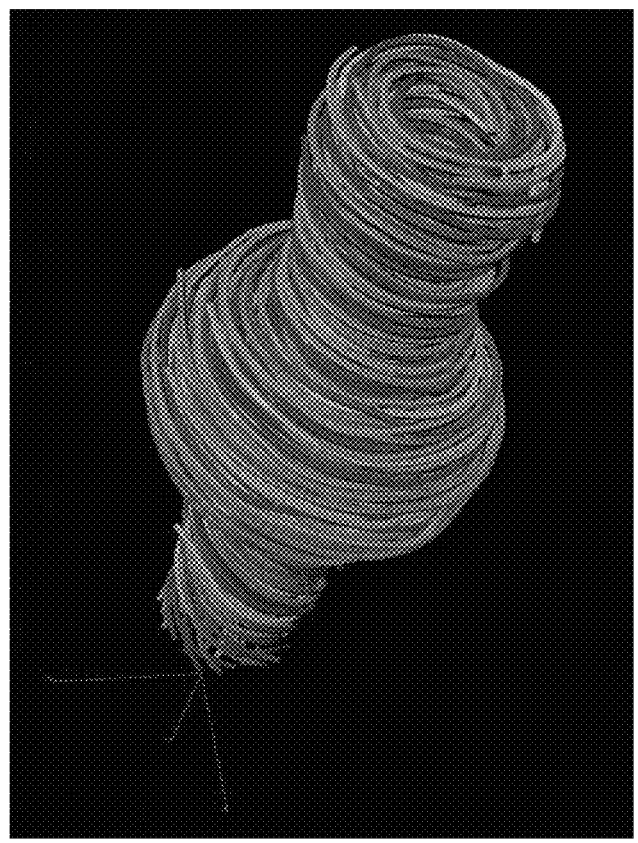
FIG. 11B depicts the model of FIG. 11A with a plurality of materials forming subsurface strands of the model, as opposed to the homogenous strands of a singular material depicted in FIG. 11A, in accordance with an embodiment of the current invention.

An example of the method above is shown in FIGS. 9A-9B. As shown in FIGS. 9A-9B, a model of an annular tube can be created with a substructure that is optimizable to provide uniform compression and expansion about the diameter of the tube, thereby allowing for the creation of a deformable object to reduce the amount of support structure needed during printing. The model of FIGS. 9A-9B can be created by the vector trails described above. Another example of such a vector trail-based model is shown in FIG. 10, which is an annular cylinder that is bend in one axis, thereby creating a curved model with a defined radius of curvature. Moreover, FIGS. 11A-11B show yet another example of the geometries that can be generated via the methods described herein, with a controlled expansion of one area of the annular tube modeled in the figures. The controlled anomalies of the model are not restricted to compression-based deformations; instead, bulging and/or lengthening deformations can be introduced to the model to emphasize different structures or properties. Deformations can be induced in a three-dimensional model by mechanical, electrical, thermal, or other energy methods. As shown in particular in FIG. 11B, subsurface strands of the model can consist of multiple different materials to contribute to variations in properties across the model; alternatively, the strands can be homogenous, depending on the requirements and desires for the printed object. Lengthening of individual fibers via the vector trail methods discussed above can contribute to the creation of a deformation within the model to manufacture a more accurate object.

Example 3—Growth of Structures from a Curved Input

The examples above describe different irregularly-shaped inputs and outputs. The methods of creating such outputs from curved inputs as described herein in more detail. Creating collagen in this manner involves taking a curve input and wrapping fibers around the input to create a tube that resembles a vessel, and shares many steps with that of Example 1, described in greater detail above.

Figure 12A:
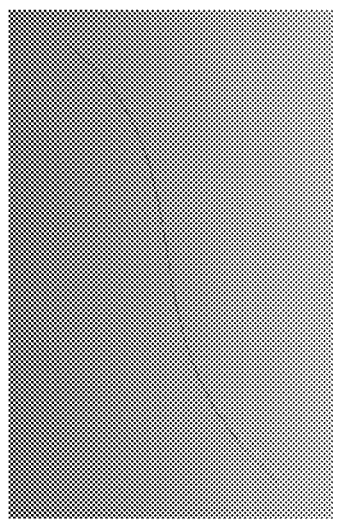
FIG. 12A depicts an input of a curve about which fibers will be grown, in accordance with an embodiment of the current invention.
Figure 12B:
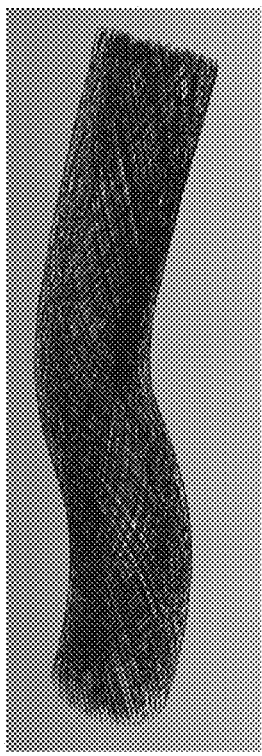
FIG. 12B depicts an output field of fibers based on the input of FIG. 12A.

The simulation of Example 3 only has one input, which is the curve around which the fibers will be wrapped. This input should be a NURBS curve, a Bezier curve, or a polyline curve object for the simulation to run successfully. An example of such a curve is depicted in FIG. 12A. The output of the simulation is a tube structure, such as that shown in FIG. 12B, including strands that rotate around the length of the tube.

Similar to Example 1, Example 3 includes a number of tunable parameters that shape the growth of the field of created fibers, including initialization parameters, simulation parameters, and post-processing parameters. The initialization parameters can only be edited before the start of the simulation. Any changes made after the start of the simulation will not take effect and the simulation will have to be recalculated in order to see the results. The simulation parameters are referenced during the runtime of the simulation and can be edited to create changes dynamically as the simulation runs. These simulation parameters can be animated, and will update as each subsequent frame is simulated. The post-processing parameters can be changed at any time, but the results are calculated at the end of the simulation, and will not update dynamically. These changes will occur across all time when they are updated.

The initialization parameters include a step length parameter, an outer radius parameter, an inner radius parameter, a strand amount parameter, a max length parameter, a length jitter parameter, and a reverse direction parameter. The step length parameter controls how many divisions along the curve will be made, as long as how long the distance between each point on the final fiber will be. The outer radius parameter controls the outer radius of the resulting tube of collagen, and the inner radius parameter control the inner radius of the collagen tube. The strand amount parameter controls the number of strands to be propagated through the field of collagen. The maximum strand length is a soft upper limit parameter on the length of an individual extent of collagen fibers. The length jitter parameter creates a random length variation in each individual starch of collagen. For example, if Max Length is set to 0.7 and Length Jitter is 0.2, the length range for each stretch of collagen is between 0.5 and 0.9. The reverse direction parameter determines whether to invert the forward direction of the curve.

The simulation parameters include, for example, rotation multipliers that determine the steepness of the spiral for tube of collagen.

Post-processing parameters include, for example, twist amounts, subdivisions, collagen radii, collagen colors, and backbone scales. The twist amount parameter describes the degrees of rotation that the backbone of the collagen structure undergoes between the beginning and end of a fiber strand. The subdivision parameter controls the amount of geometry that each collagen strand has, helping to smooth out rougher strands. The collagen radius parameter controls the width of collagen fibers. The collagen color parameter describes a color of a strand of fiber in the structure. The backbone scale parameter determines the non-uniform scale value of the object's backbone.

Figure 12C:
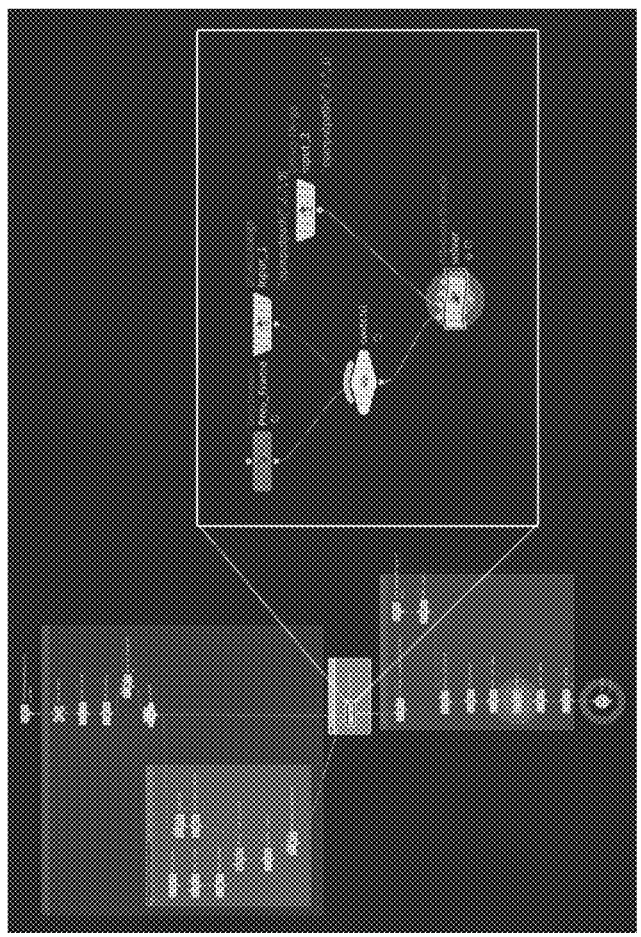
FIG. 12C is an overview of the initialization, simulation, and post-processing steps of a method.

The process of solving the inputs includes three steps, which correspond to the initialization parameters, simulation parameters, and post-processing parameters. Initialization nodes are only executed at the start of the simulation, and as such do not have any bearing on the state of the results after the first frame. Simulation nodes create incremental changes based off of the base state. Post-processing nodes are executed after the solve step, have the same effect on the system every time, and are not subject to incremental changes. Post-processing nodes do, however, change on each frame as a result of the incremental changes in the previous simulation step, but the post-processing effect will not change values incrementally like they can in the simulation step. An embodiment of the node setup is shown in FIG. 12C, including color coding according to which step in the process the nodes belong, with red representing the initialization step, yellow representing the simulation step, and green representing the post-processing step.

Figure 12D:
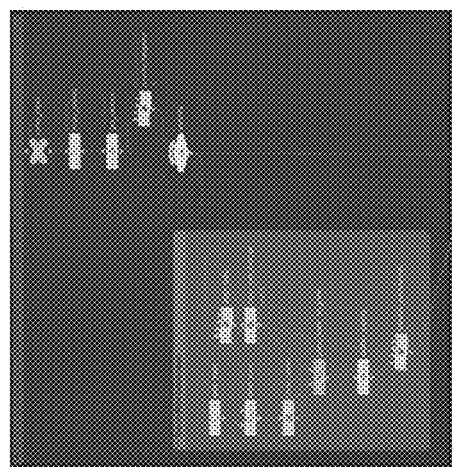
FIG. 12D is a detailed view of the initialization steps of the method of FIG. 12C.

The initialization step is shown in more detail in FIG. 12D. In the initialization step, the simulation first discretizes the curve into a number of points with a distance between each other equal to the step length parameter. Then, at each point, a tangent value is calculated that will serve as the forward direction for the growth of the collagen. After that, depending on the reverse direction parameter, the tangent value may be reversed if necessary.

Figure 12F:
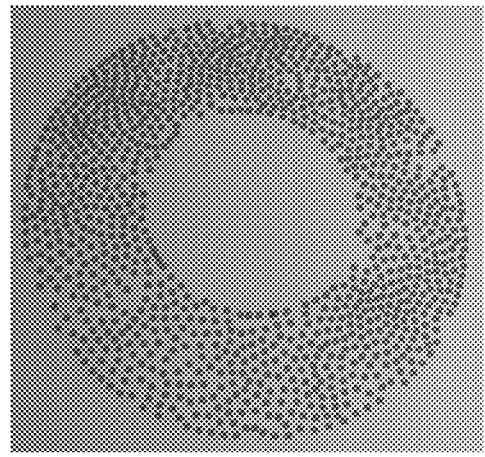
FIG. 12F depicts a distribution of points about the source volume of FIG. 12E.
Figure 12E:
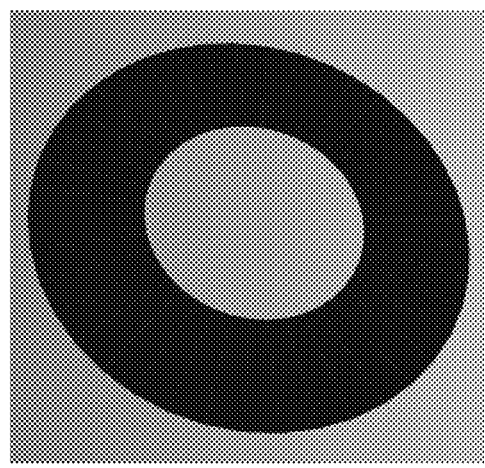
FIG. 12E depicts a source volume based on outer radius and inner radius parameters, with a cutout in the center of the volume.

After initializing the curve, the simulation creates the source points. In order to know where to place them, a disk with a cutout in the center is made based on the outer radius and inner radius parameters, as shown in FIG. 12E. Then a number of points equal to the value of the strand amount are scattered across the surface, as shown in FIG. 12F. Once the points are created, the last step is to initialize some parameters that will help in the simulation step. Each point keeps track of its distance from the center line so that individual points can maintain a constant distance from the center line as the points progress along the tube. Additionally, each body keeps track of its current length, and calculates a max length based on the max length and length jitter parameters.

Figure 12H:
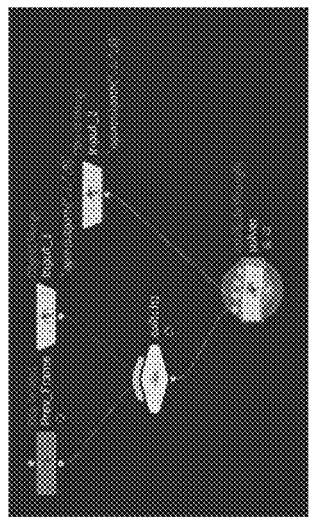
FIG. 12H is a detailed view of the nodes that entail the subnetwork of the simulation steps of FIG. 12G.
Figure 12G:
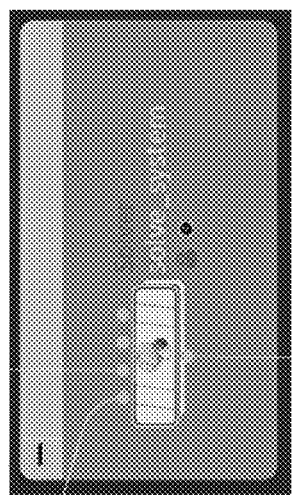
FIG. 12G is a detailed view of the simulation steps of the method of FIG. 12C.

During the subsequent stimulation step, each individual fiber expands, following along the input path and rotating around the path until the fiber reaches the end of the path. At the end of the path, the fiber either stops growing or reaches the end of its pre-described length, creating a new fiber. The simulation step is shown in more detail in FIGS. 12G-12H.

Figure 12K:
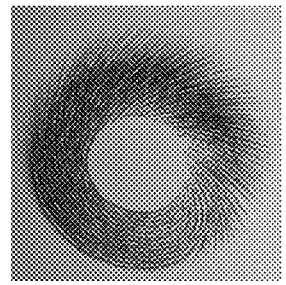
FIG. 12K depicts a final result vector that is calculated to determine new point locations based on the vectors of FIGS. 12I-12J.
Figure 12J:
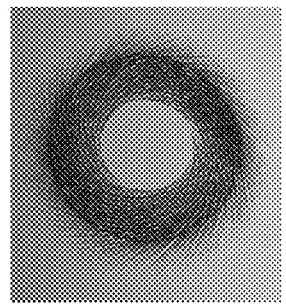
FIG. 12J depicts the spin direction that the particles should be rotating around the fibers of FIG. 12I.
Figure 12I:
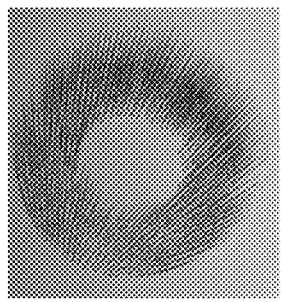
FIG. 12I depicts the forward growth vectors about the volume of FIG. 12E that is obtained by retrieving the tangent value at the closest point on the curve to the current particle.

The simulation step begins by calculating, or retrieving, two main vectors that are combined together to determine the growth direction at each particle in space. The vector is the forward value for the collagen shown in FIG. 12I, which is obtained by retrieving the tangent value at the closest point on the curve to the current particle. The second main value is the spin direction that the particles should be rotating around the collagen, shown in FIG. 12J. These two vectors are then added together, with a weight applied to the spin vector as determined by the rotation multiplier parameter. The added weight determines how much strength the rotation multiplier parameter has over the direction vector. In the example shown in FIG. 12K, higher weights will result in collagen fibers with steeper winding around the length of the tube. The final result is the vector that is used to determine where the new point location is going to be, as shown in FIG. 12K.

After the result vector is calculated, a new location is calculated based on that vector, the current point location, and the step length parameter. The new point is placed along the direction vector, the new point being placed a distance of the step length away from the current point's location. After this, to ensure that the rotation does not cause the points to expand away from the center line, the point is moved closer to the center line until its distance is equal to its starting distance from the center line. This ensures that all points are within the inner and outer radius described the parameters. Finally, the simulation determines whether to connect the subsequent and previous point by checking the length of the current collagen strand (assuming the new point would be added) against its max length as calculated in the initialization step. Each individual strand will stop propagating once its closest point is the terminal point in the curve input. At this point, the simulation will stop calculating the new vectors and the length of fiber is complete.

Figure 12L:
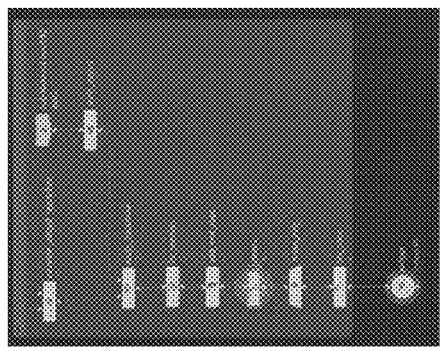
FIG. 12L is a detailed view of the post-processing steps of the method of FIG. 12C.

As shown in FIG. 12L, the post-processing step takes the output from the simulation step, the strands that will represent the collagen fiber, and turns the output into polygonal geometry. The first operation of the step subdivides the curve output by an amount specified by the subdivisions parameter. The subdivision helps smooth out the mesh where the rotation is not discrete enough. After finalizing the spline shape, the backbone that was passed is modified by the scale factors provided in the backbone scale parameter, non-uniformly, and then down to the size specified by the collagen radius parameter. After these two modifications are performed, the backbone is swept down each of the collagen fibers, while being rotated an amount equal to the twist amount parameter. Then, any stray points or faces that do not constitute full watertight geometry are pruned from the object, and the object is converted into polygons. Finally, a color, determined by the collagen color parameter is assigned and the polygon geometry is returned.

Example 4—Texture Map-Based Fiber Generation

Figure 13A:
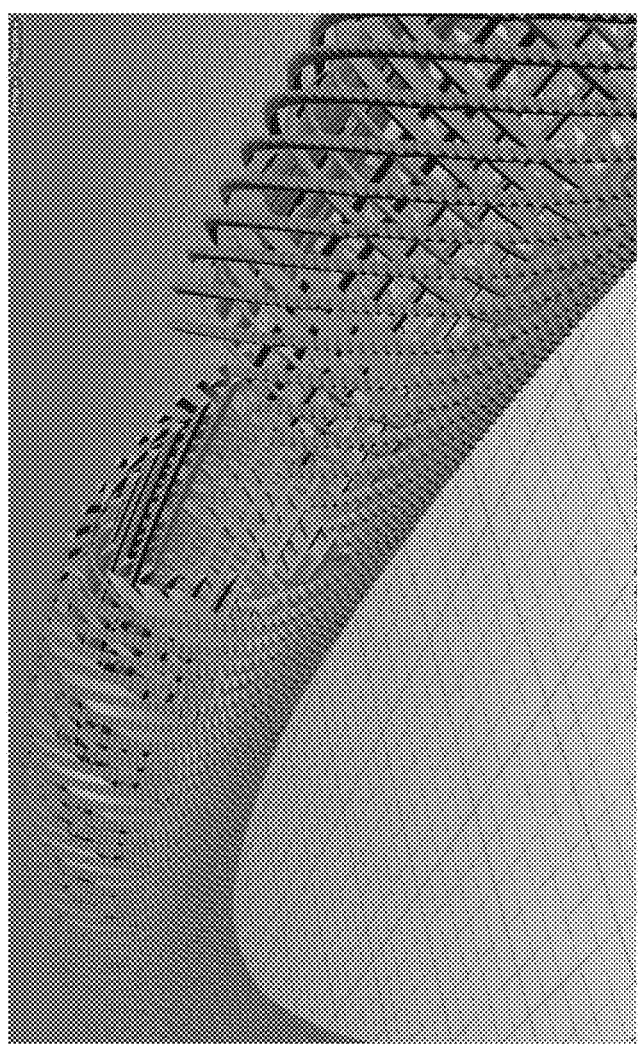
FIG. 13A is a cut away view of a mesh representative showing three layers of distributed collagen strands of a vascular volume, in accordance with an embodiment of the current invention.
Figure 13B:
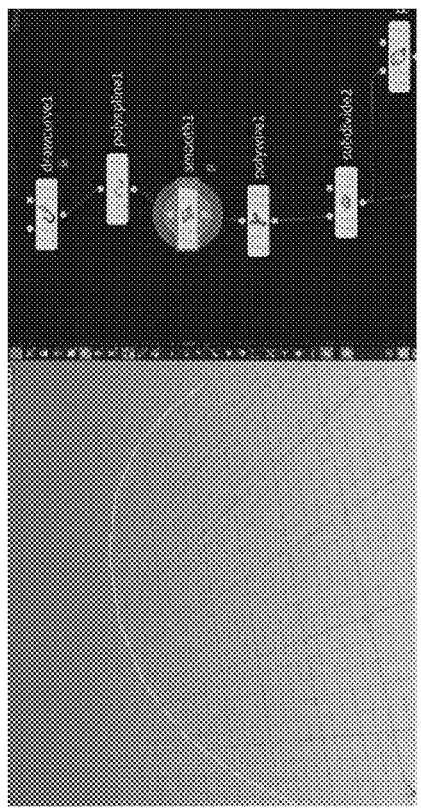
FIG. 13B depicts a step of pathing a spline to grow the mesh of FIG. 13A.
Figure 13D:
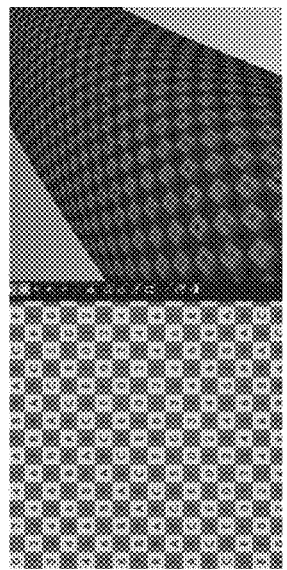
FIG. 13D depicts a UV map of the tube of FIG. 13C.
Figure 13C:
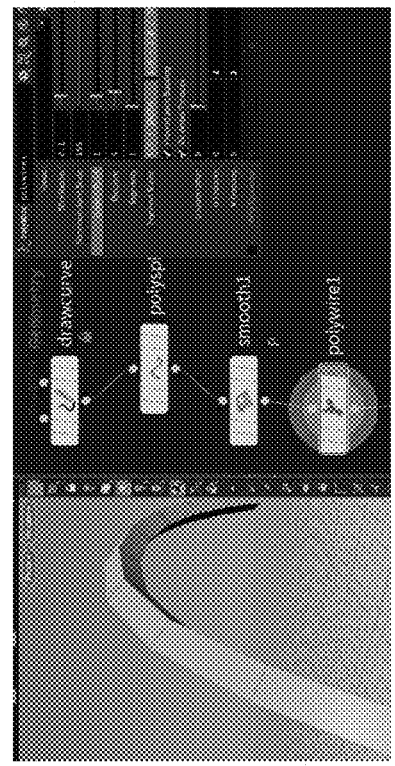
FIG. 13C depicts a tube distributed along the length of the spline of FIG. 13B.
Figure 13E:
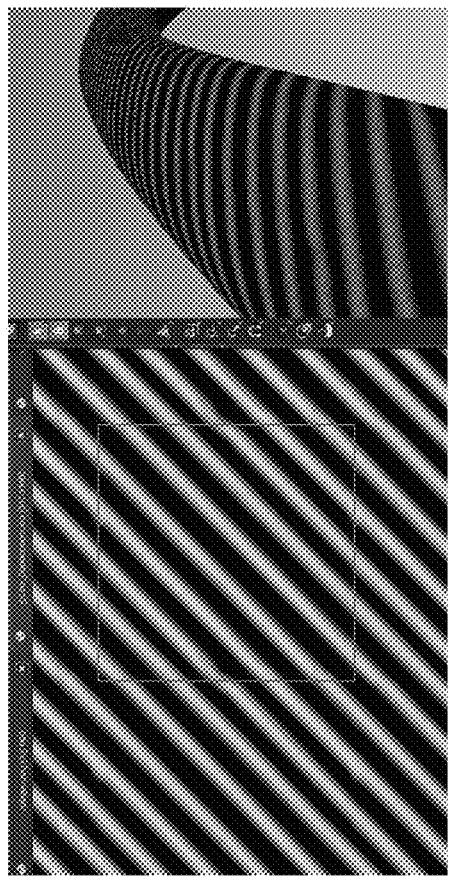
FIG. 13E depicts a black-and-white displacement map of the grown tube of FIG. 13C.
Figure 13F:
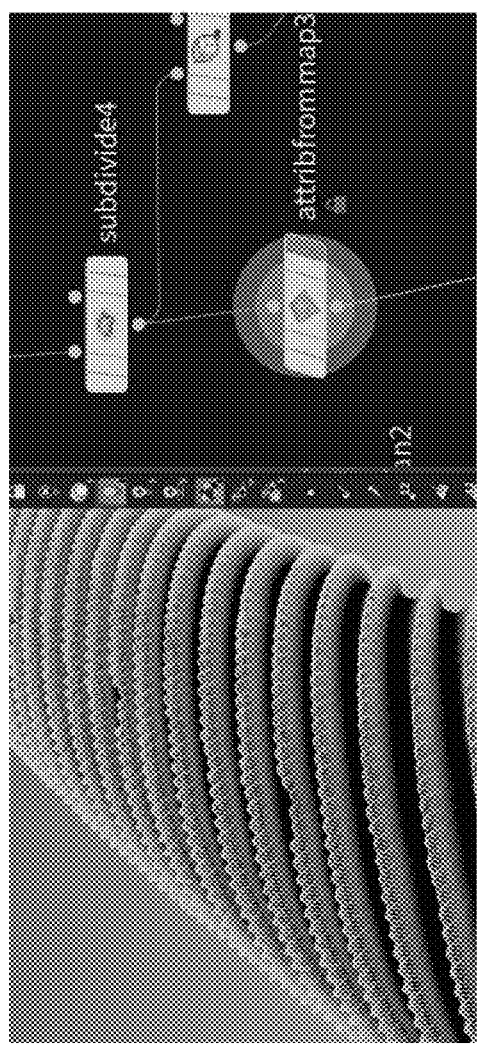
FIG. 13F depicts the displacement of the geometry from the surface of the tube of FIG. 13C.
Figure 13G:
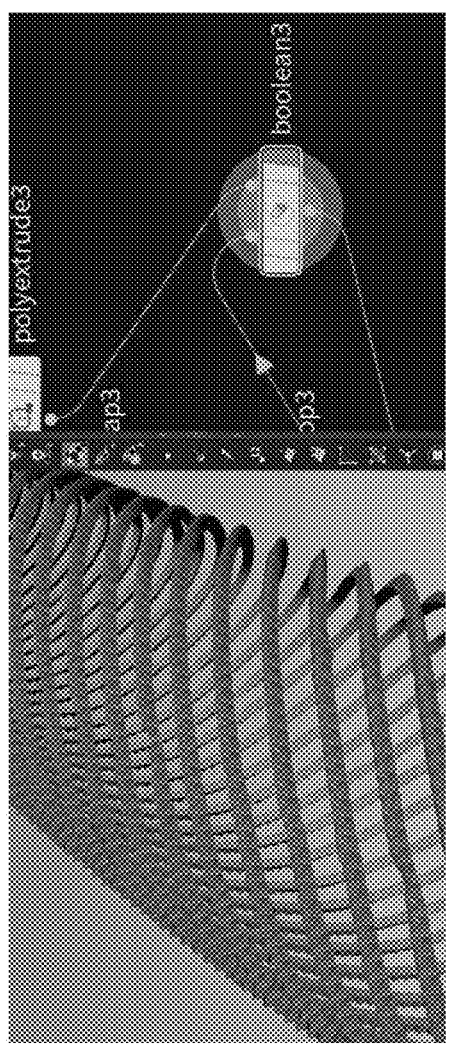
FIG. 13G depicts the subtraction of a Boolean algorithm from the displaced geometry of FIG. 13F.
Figure 13H:
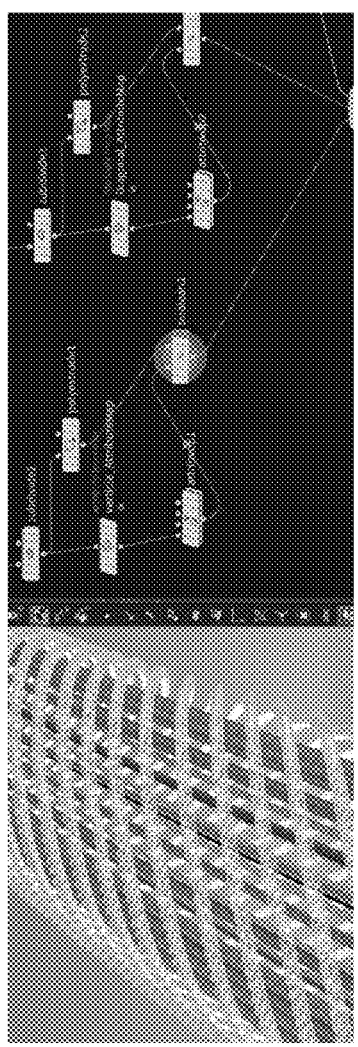
FIG. 13H depicts the layering of fibers along the geometry of FIG. 13F.
Figure 13L:
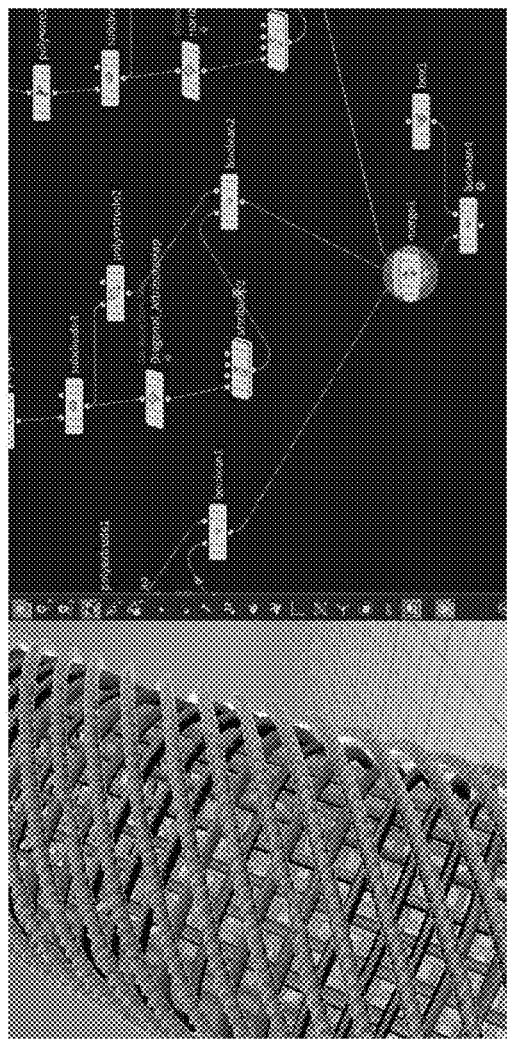
FIG. 13I depicts the offsetting of the layered fibers of FIG. 13H.

In a fourth example, texture maps are used in "path-finding" to distribute and propagate structures. Texture maps, alone and in combination with mesh displacement and a UV-coordinate based unwrapped mesh representative of a volume, can also be used to generate contiguous repeating structures (such as fibers) for geometry growth. In addition, three-dimensional fibers can be generated using one or more UV-based texture maps for mesh displacement through the chosen volume. An example of a resulting mesh including three different distributed structures defined within a vascular volume is shown in FIG. 13A, with the vascular volume itself not shown in the figure. The method of using texture maps to generate the mesh of FIG. 13A includes the generation of geometries, including a step of pathing the spline of a system, such as a vascular system, as shown in FIG. 13B. Next, a simple tube is distributed along the length of the spline, as shown in FIG. 13C, and the simple tube is UV unwrapped and unitized, as shown in FIG. 13D. As shown in FIG. 13E, a black and white displacement map (or a vector displacement map) is generated, tiled in the U and V directions (which correspond with the x- and y-directions, respectively, on the 2D texture space). The geometry is displaced from the tube's surface, as shown in FIG. 13F. The Boolean subtracts a slightly enlarged tube from the newly displaced geometry, as shown in FIG. 13G. Then, as shown in FIGS. 13H-13I, the direction of the fibers is then layered and offset to create the final geometry. It should be appreciated that more complex, woven, or interlocking distributed geometries, such as fish scale or chain mail-type structures, can be created in the same manner by alternating between texture maps at discrete layers from outermost to innermost levels.

Example 5—Replication of a Brain Aneurysm

The methods described above can be implemented in the simulation and generation of accurate anatomical models, particularly for the study of diseases and illnesses. For example, an accurate brain aneurysm can be printed through the methods described above. The replica aneurysm can then be studied to recommend treatment. The replication of the aneurysm model will be discussed herein below.

Ruptured brain aneurysms cause half a million deaths worldwide each year. Brain aneurysms are found in 3-5% of the population and have an overall rupture risk of 1.2% within 5 years after diagnosis. The formation and growth of aneurysms result from a complex interaction of genetic, physiological, environmental, tissue mechanics, and fluid mechanics. Most brain aneurysms develop at bifurcations or arterial branches, where the flow topology is complex. [3].

Dimension is the basis for aneurysm classification. Aneurysms are considered small if their largest dimension falls below 10 mm, large between 10 and 25 mm, and giant above 25 mm. While the risk of rupture increases with the size of the aneurysm, a significant number of ruptured aneurysms measure less than 7 mm [3]. These findings have motivated the study of the aneurysm flow patterns on a case by case basis.

To capture volumetric velocity and pressure fields under simulated physiological cardiac waveforms, researchers are leveraging a technique called 4D flow MRI. In 4D flow (i.e. three-dimensional and time-resolved) MRI, an in vitro replica of a patient-specific aneurysm is connected to and placed inside a pump system. Current 4D flow studies are limited by the mechanics of the 3D-printed aneurysm replica. The widespread use of rigid vessel models stems from the lack of in vivo data on vessel wall constitutive properties. Studies using dynamic angiography coupled with CFD (computational fluid dynamics) models have shown marginal wall motion effects on flow pattern but noticeable changes in wall shear stress. [4]. Retrospective studies have further revealed a correlation between aneurysm wall motion and rupture. [5]. CFD studies featuring fluid-tissue interaction have shown a correlation between aneurysm volume variation, throughout the cardiac cycle, and rupture probability. [6, 7].

Although rare, some researchers have developed hybrid simulations that take the compliance of the walls into account. Yet, these models also lack validation due to the scarcity of tissue constitutive data. The methods described herein seek to introduce a 3D-printed model that replicates the anatomy and features known, tunable, and anisotropic mechanical properties. The model ultimately serves as a validation tool for hybrid simulations.

Figure 14:
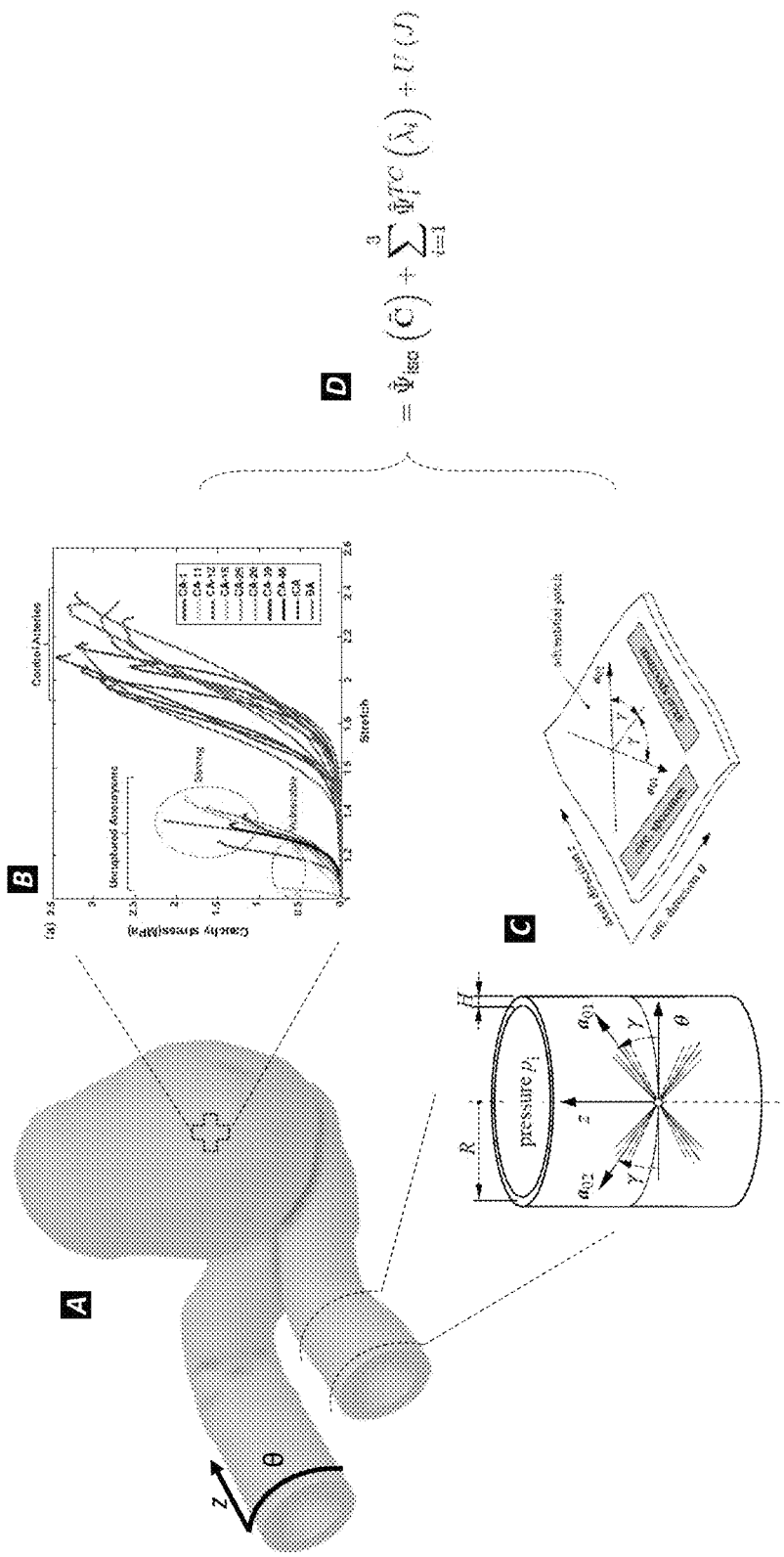
FIG. 14 depicts a prior art process for the creation of a constitutive equation or model of a giant brain aneurysm, as shown in section (A) of FIG. 14. Researchers use empirical mechanical data, shown in section (B) of FIG. 14 and as obtained from classical mechanical characterization experiments shown in FIG. 15. Researchers also estimate and describe the microstructure of the tissue in such a way that the final mathematical formulation captures the effect of all tissue constituents, like fibers shown in section (C) of FIG. 14. The final equation captures the additive effect of each tissue constituent, an isotropic matrix and anisotropic fibers with an exponential stiffness as observed empirically, as described in section (D) of FIG. 14.

Researchers performing classical mechanical characterization attempt to optimize a mathematical formulation that describes the tissue behavior in 3D, as shown in FIG. 14, particularly section D of FIG. 14. Said mathematical formulations are also referred to as constitutive equations or models. Constitutive equations are used within Finite Element Analysis (FEA) to study loading distribution and/or deformation of a material. More specifically, with a constitutive model that describes the mechanical properties of an arterial wall, researchers can simulate the deformation and stresses caused by guidewires and stents interacting with the tissue. More specific to the case of the brain aneurysm, hybrid FEA and CFD models can shed light on the influence of blood flow patterns on the stability or growth of aneurysms. In general, mathematical models and solutions are a cost-effective way to investigate the influence of external parameters (e.g. loads and displacements) on the materials of interest, such as arterial walls. Although practical, mathematical models rely on physical assumptions in order to be time-efficient and reduce the number of variables. Validation therefore relies on additional empirical data, which is scarce in the field of biomechanics. The methods described herein seek to satisfy the need for validation by generating a patient-specific model with approximate mechanical behavior. Researchers can use optimized mathematical formulations to describe the growth of bodies and fiber-like structure that best mimic the physical behavior of the target.

Figure 15:
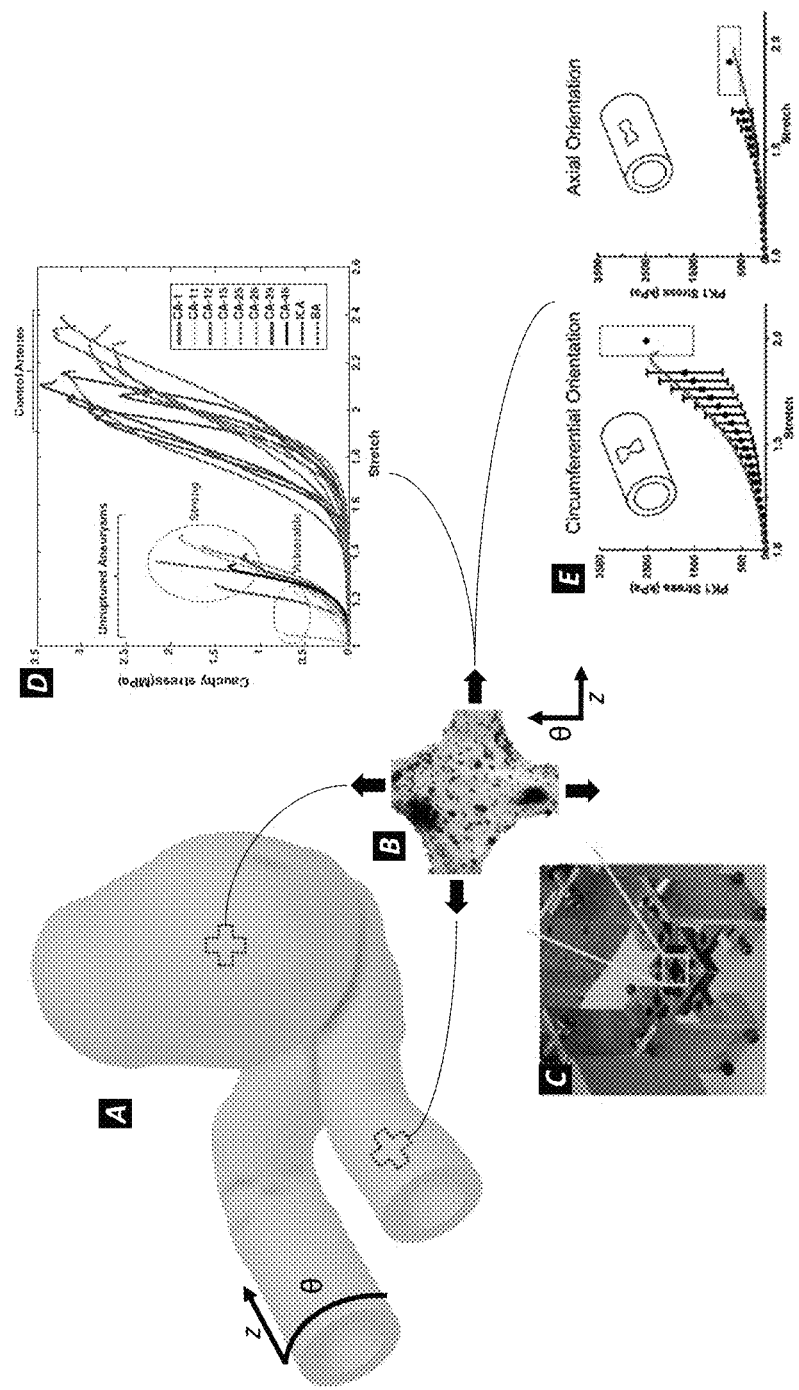
FIG. 15 depicts a prior art mechanical characterization process. Uniaxial and biaxial mechanical testing require dissecting specific geometries from a tissue sample. Two cruciform samples are dissected from a giant brain aneurysm, as shown in section (A) of FIG. 15. To measure strain properly, specimens are stained for optical strain tracking, with the results being depicted in section (B) of FIG. 15. Specimens are then loaded to a mechanical testing system configured for a biaxial experiment, as depicted in section (C) of FIG. 15. Multiple specimens, from different regions of the tissue shown in section (A), are extracted and analyzed to compare stiffness variation along direction (E) and between healthy and diseased regions, with the analysis results appearing in section (D) of FIG. 15.

To recreate the anisotropic mechanics of healthy and diseased arterial tissue, the methods rely first on a user's knowledge of the mechanical and micro-structural characteristics of the tissue. Researchers in the field of biomechanics and tissue mechanics study the structure and physical behavior of tissues through imaging and mechanical testing. Uniaxial and biaxial mechanical characterization of arteries and aneurysms reveal orientation-dependent properties (anisotropy) and stiffness disparities between healthy and disease tissue (aneurysm), shown in FIG. 15. Imaging of the structural proteins (e.g. collagen, elastin) and their alignment support these findings, as shown in FIG. 14. The methods herein use either or both resources to fabricate a model that approximates the anisotropic properties of the tissue.

Figure 16:
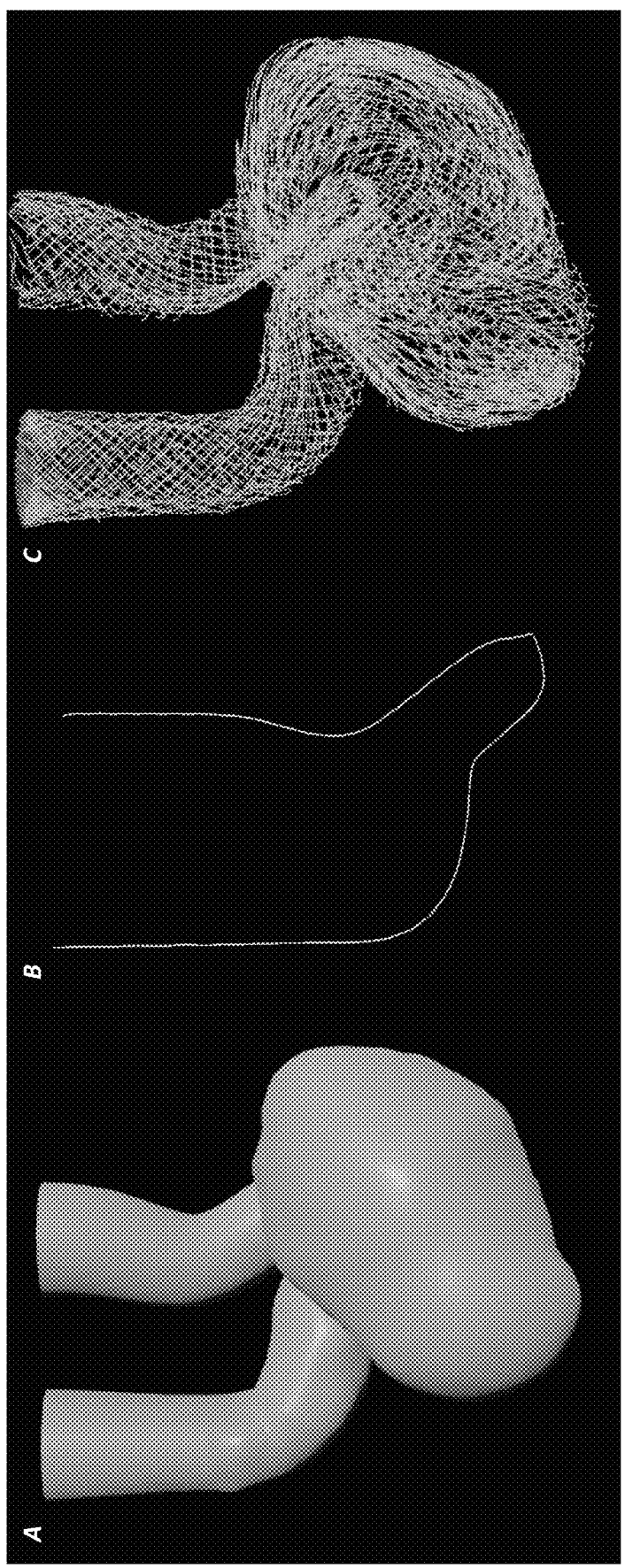
FIG. 16 depicts a source mesh input, a spline used to grow fibers to match the source mesh input, and an output including fibers grown along the spline.
Figure 17:
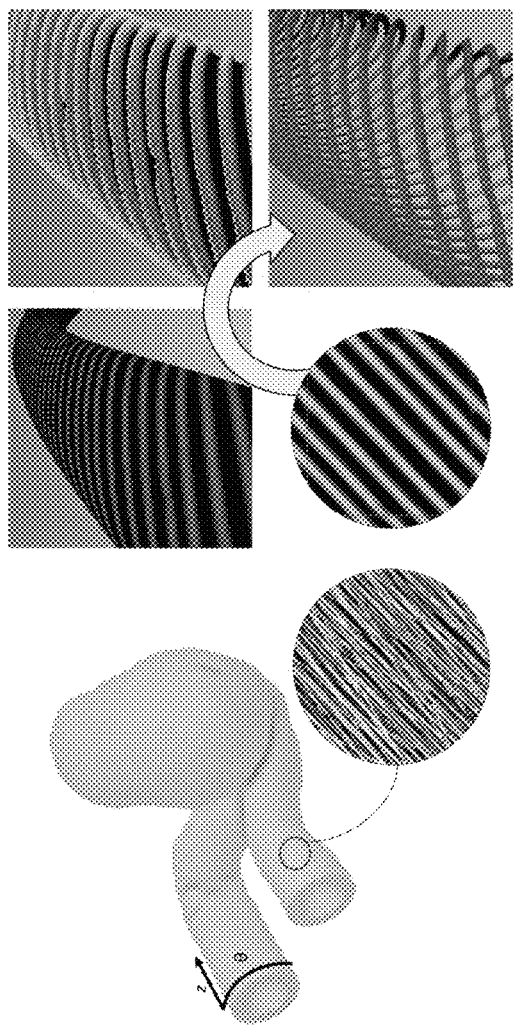
FIG. 17 depicts the mesh structure of the grown fibers depicted in FIG. 16, in accordance with an embodiment of the current invention.

Starting with a surface mesh representative of the patient-specific aneurysm, the methods use a consecutive combination of the spline and space colonization growth methods described above to generate the paths of fiber growth. FIG. 16 demonstrates the source mesh. Using a combination of the spline-based growth and the space colonization growth methods, the methods herein are able to create collagen structures for rather complicated geometries. In the example of FIGS. 16-17, an aneurysm mesh based on medical data is provided, a center path through the vessel is calculated, and collagen fibers are generated to encompass the inner shape of the mesh.

During the initialization phase of creating this structure, a path is calculated that runs the length of the vessel. Then, the tangent vector of this curve is calculated, flowing in the direction in which the collagen fibers will be created along. This provides not only a forward direction, but also a vector that can be crossed to get a rotation angle for each point of the simulation.

After the initialization, a field was created including random points scattered throughout the volume of the outer shell of the aneurysm. These points served to tell each fiber line where it could not grow, by adding a max distance each line can search to find a new point to grow towards. The algorithm uses a source group of points at the start, and draws a line between each point and a new point that is the average of the surrounding point locations, the direction vector, the rotation vector, and a rotation scale. The process of calculating new points continues until there are no unused points left within range of any of the actively searching points, and results in an accurate fibrous structure like the one shown in FIGS. 16-17.

Example 6—Respirator Mask Having Anisotropic Properties

Figure 18:
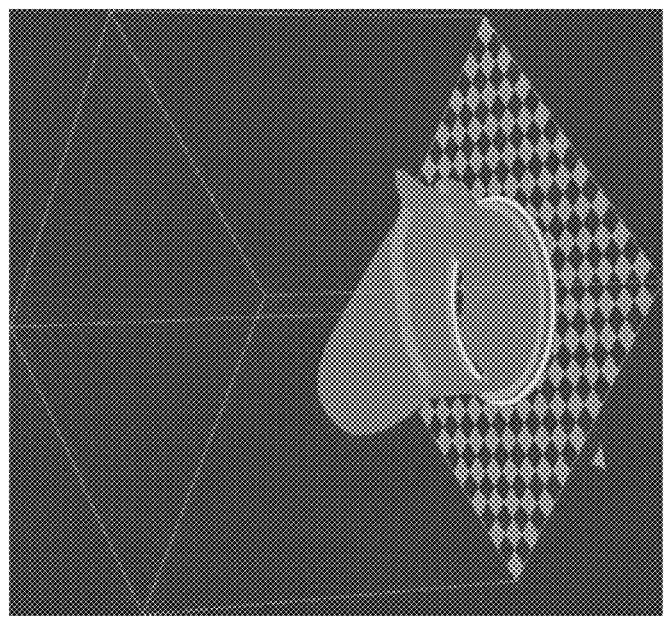
FIG. 18 depicts an embodiment of a respiratory mask including anisotropic physical properties manufactured according to the methods described herein.

In addition, the methods described above can be implemented in the simulation and generation of respiratory masks, as shown in FIG. 18. The respiratory mask includes a filter designed to prevent the transmission of airborne pathogens, such as those associated with severe acute respiratory coronavirus 2 (SARS-CoV-2) and similar infectious diseases. The respiratory mask includes a proximal side that is configured to be a user-facing side of the mask. The proximal side includes a perimeter that is defined by the domain, described above. As such, the proximal side of the mask includes one or more physical properties exhibiting anisotropic behavior. Accordingly, the proximal side of the respiratory mask is configured to conform to a face of a wearer to form a continuous seal while allowing facial movements, breathing, and speaking by the wearer. The improved respiratory mask, by accurately exhibiting true anisotropy, reduces the chance of airborne pathogen transmission to and from the wearer.

CONCLUSION

The accuracies of additive manufacturing processes can be further improved by providing a feedback loop system within the additive manufacturing process to accurately measure a component or object's physical properties. Prior to starting the process of selecting and optimizing the geometries and properties of the three-dimensional model that will ultimately represent an original object to be replicated, the physical properties of the original object can be measured and recorded as a reference for the model. As such, physical characterizations of the original object can be performed via tests, experiments, and measurements to obtain or approximate the physical behaviors and properties of the original object, with the resulting data being used to generate a high-fidelity replica object. Moreover, these physical characterizations can be obtained for initial estimate additive manufactured objects, such as rough drafts manufactured to test the accuracy of the physical properties compared with the desired properties. Such characterizations are useful in optimizing a printed object through a physical, non-virtual test, contributing to a feedback loop to improve the accuracies of the manufactured object.

REFERENCES

[1] C. Witzenburg, R. Raghupathy, S. M. Kren, D. A. Taylor and V. H. Barocas, "Mechanical changes in the rat right ventricle with decellularization," Journal of Biomechanics, no. 45, pp. 842-849, 2012.

[2] C. M. Witzenburg, R. Y. Dhume, S. B. Shah, C. E. Korenczuk, H. P. Wagner, P. W. Alford and V. H. Barocas, "Failure of the porcine ascending aorta: Multidirectional experiments and unifying microstructural model," Journal of Biomechanical Engineering, vol. 139, 2017.

[3] O. Amili, D. Schiavazzi, S. Moen, B. Jagadeesan, P.-F. Van de Moortele and F. Coletti, "Hemodynamics in a giant intracranial aneurysm characterized by in vitro 4D flow MRI," PLoS ONE, vol. 1, no. 13, 2018.

[4] E. Oubel, M. De Craene, C. Putman, J. Cebral and A. Frangi, "Analysis of intracranial aneurysm wall motion and its effects on hemodynamic patterns," Proc. SPIE 6511, Medical Imaging 2007: Physiology, Function, and Structure from Medical Images, 2007.

[5] Vanrossomme, X A E; Eker, O F; Thiran, J P; Courbebaisse, G P; Zouaoui Boudjeltia, K. "Intracranial aneurysms: Wall motion analysis for predicting rupture," American Journal of Neuroradiology, vol. 10 issue 36, pp. 1796-1802, 2015.

[6] Sanchez M, Ambard D, Costalat V, Mendez S, Jourdan F, Nicoud F. "Biomechanical assessment of the individual risk of rupture of cerebral aneurysms: A proof of concept," Annals of Biomedical Engineering, vol. 1 issue 41, pp. 28-40, 2013.

[7] Sanchez M, Ecker O, Ambard D, Jourdan F, Nicoud F, Mendez S, et al. "Intracranial aneurysmal pulsatility as a new individual criterion for rupture risk evaluation. Biomechanical and numeric approach (IRRAs Project)," American Journal of Neuroradiology, vol. 9 issue 35, pp. 1765-1771, 2014.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of propagating one or more bodies for an additive manufactured object, the method comprising the steps of:

calculating one or more physical properties of a target object, wherein the one or more physical properties exhibit anisotropic behavior;

generating a virtual three-dimensional representation of the target object based on a shape of the target object, a volume of the target object, and the calculated one or more physical properties exhibiting anisotropic behavior by:

defining a domain of the target object in the three-dimensional representation, the domain defining an outer mesh that forms an anisotropic and modifiable boundary, the domain configured to describe the calculated one or more physical properties exhibiting anisotropic behavior of the target object, the domain of the target object being defined by a propagation algorithm using data selected from the group consisting of vector fields and texture maps, thereby describing anisotropic behavior of the target object;

selecting one or more bodies to propagate about the domain using the propagation algorithm, wherein each of the one or more bodies comprise the calculated one or more physical properties of the target object, and wherein the outer mesh limits the propagation of the one or more bodies;

selecting a first set of parameters for each of the one or more bodies, the first set of parameters selected from the group consisting of angles, lengths, widths, densities, frequencies, and combinations thereof, wherein the first set of parameters further define the domain and optimize the calculated one or more physical properties of the target object;

propagating the one or more bodies throughout the three-dimensional representation of the target object, following the domain and limited by the outer mesh; and selecting a second set of simulation parameters for each of the one or more bodies, wherein the second set of simulation parameters includes one or more values selected from the group consisting of a separation distance between subsequent discrete points, a discrete point offset value, a seed number to alter an offset between discrete points, and a relax iteration value to set a maximum number of simulations, the second set of simulation parameters configured to be updated throughout the step of propagating the one or more bodies.

2. The method of claim 1, further comprising a step of comparing the generated three-dimensional representation with the shape, the volume, and the calculated one or more physical properties exhibiting anisotropic behavior of the target object, and, based on a determination that the three-dimensional representation differs from the target object by more than a tolerance value, optimizing the three-dimensional representation by modifying the domain by modifying one or more of the propagated bodies and modifying the outer mesh.

3. The method of claim 1, further comprising a step of, based on a determination that the generated three-dimensional representation differs from the target object by less than a tolerance value, instructing an additive manufacturing system to generate a physical object based on the three-dimensional representation.

4. The method of claim 1, further comprising a step of selecting a post-processing set of parameters after the step of propagating the one more bodies is completed, wherein the post-processing set of parameters includes one or more values selected from the group consisting of a rotation degree of the one or more bodies, a width of each strand, and an inversion of the three-dimensional representation.

5. The method of claim 1, wherein the step of defining the domain of the target object in the three-dimensional representation further comprises generating a bounding box volume about the defined shape and volume in the three-dimensional representation, such that the outer mesh and the one or more bodies are propagated only within the bounding box volume.

6. The method of claim 1, wherein the target object is a respiratory mask including a filter designed to prevent the transmission of airborne pathogens, the respiratory mask including a proximal side configured to be a user-facing side of the respiratory mask, the proximal side including a perimeter defined by the outer mesh of the domain configured to describe the calculated one or more physical properties exhibiting anisotropic behavior of the target object, such that the proximal side of the respiratory mask is configured to conform to a face of a wearer to form a continuous seal while allowing facial movements, breathing, and speaking by the wearer.

7. The method of claim 1, further comprising the steps of:
analyzing a plurality of particles across the volume of the target object at each discrete point of the volume;
storing a vector for each of the plurality of particles within the propagated one or more bodies to generate a plurality of vector trails across a plurality of iterations, each of the plurality of vector trails representing translations of each of plurality of particles across the plurality of iterations;
calculating a rotational vector at each discrete point of the volume; and
applying a weight to the rotational vector to adjust an orientation of the plurality of vector trails
wherein a translation of a particle from a first of the one or more bodies to a second of the one or more bodies results in a termination of a first vector within the first of the one or more bodies and a generation of a second vector within the second of the one or more bodies.

8. A method of designing and optimizing an object for additive manufacturing, the method comprising the steps of;
receiving an input of a shape and volume of a target object;
calculating one or more physical properties of the target object, wherein the one or more physical properties exhibit anisotropic behavior;
generating a virtual three-dimensional representation of the target object based on the shape, the volume, and the calculated one or more physical properties exhibiting anisotropic behavior by:
defining a domain of the target object in the three-dimensional representation, the domain defining an outer mesh that forms an anisotropic and modifiable boundary, the domain configured to describe the calculated one or more physical properties exhibiting anisotropic behavior of the target object, the domain of the target object being defined by a propagation algorithm using data selected from the group consisting of vector fields and texture maps, thereby describing anisotropic behavior of the target object;
selecting one or more bodies to propagate about the domain using the propagation algorithm, wherein each of the one or more bodies comprise the calculated one or more physical properties of the target object, and wherein the outer mesh limits the propagation of the one or more bodies;
selecting a first set of parameters for each of the one or more bodies, the first set of parameters selected from the group consisting of angles, lengths, widths, densities, frequencies, and combinations thereof, wherein the first set of parameters further define the domain and optimize the calculated one or more physical properties of the target object;
propagating the one or more bodies throughout the three-dimensional representation of the target object, following the domain and limited by the outer mesh; and
selecting a second set of simulation parameters for each of the one or more bodies, wherein the second set of simulation parameters includes one or more values selected from the group consisting of a separation distance between subsequent discrete points, a discrete point offset value, a seed number to alter an offset between discrete points, and a relax iteration value to set a maximum number of simulations, the second set of simulation parameters configured to be updated throughout the step of propagating the one or more bodies;
comparing the generated three-dimensional representation with the shape, the volume, and the calculated one or more physical properties exhibiting anisotropic behavior of the target object, and, based on a determination that the three-dimensional representation differs from the target object by more than a tolerance value, optimizing the three-dimensional representation by modifying the domain by modifying one or more of the propagated bodies and modifying the outer mesh; and based on a determination that the generated three-dimensional representation differs from the target object by less than a tolerance value, instructing an additive manufacturing system to generate a physical object based on the three-dimensional representation.

9. The method of claim 8, further comprising a step of orienting a growth direction of each of the one or more bodies to match a directionality of the target object.

10. The method of claim/wherein normal vectors are used to maintain a constant growth direction for each of the one or more bodies.

11. The method of claim 9, wherein the propagation algorithm uses data from vector fields, further comprising a step of varying the growth direction for at least one of the one or more bodies via the vector fields.

12. The method of claim 8, further comprising a step of selecting a post-processing set of parameters after the step of propagating the one more bodies is completed, wherein the post-processing set of parameters includes one or more values selected from the group consisting of a rotation degree of the one or more bodies, a width of each strand, and an inversion of the three-dimensional representation.

13. The method of claim 8, wherein the shape of the target object is irregular and nonlinear.

14. The method of claim 8, wherein the step of defining the domain of the target object in the three-dimensional representation further comprises generating a bounding box volume about the defined shape and volume in the three-dimensional representation, such that the outer mesh and the one or more bodies are propagated only within the bounding box volume.

15. The method of claim 8, further comprising the steps of:

analyzing a plurality of particles across the volume of the target object at each discrete point of the volume; and storing a vector for each of the plurality of particles within the propagated one or more bodies to generate a plurality of vector trails across a plurality of iterations, each of the plurality of vector trails representing translations of each of plurality of particles across the plurality of iterations, wherein a translation of a particle from a first of the one or more bodies to a second of the one or more bodies results in a termination of a first vector within the first of the one or more bodies and a generation of a second vector within the second of the one or more bodies.

16. The method of claim 15, further comprising a step of calculating a rotational vector at each discrete point of the volume.

17. The method of claim 16, further comprising the step of applying a weight to the rotational vector to adjust an orientation of the plurality of vector trails.

18. The method of claim 8, wherein the target object is a respiratory mask including a filter designed to prevent the transmission of airborne pathogens, the respiratory mask including a proximal side configured to be a user-facing side of the respiratory mask, the proximal side including a perimeter defined by the outer mesh of the domain configured to describe the calculated one or more physical properties exhibiting anisotropic behavior of the target object, such that the proximal side of the respiratory mask is configured to conform to a face of a wearer to form a continuous seal while allowing facial movements, breathing, and speaking by the wearer.

* * * * *

UNITED STATES PATENT AND TRADEMARK OFFICE
CERTIFICATE OF CORRECTION

PATENT NO. : 11,042,671 B1
APPLICATION NO. : 16/946958
DATED : June 22, 2021
INVENTOR(S) : Robert Sims et al.

Page 1 of 1

It is certified that error appears in the above-identified patent and that said Letters Patent is hereby corrected as shown below:

In the Claims

Column 23, Claim 10, Line 12 should read:
10. The method of claim 9, wherein normal vectors are used Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*